US011043122B2

(12) United States Patent
Lin et al.

(10) Patent No.: US 11,043,122 B2
(45) Date of Patent: Jun. 22, 2021

(54) DIGITAL BEHAVIORAL TWIN SYSTEM FOR INTERSECTION MANAGEMENT IN CONNECTED ENVIRONMENTS

(71) Applicant: TOYOTA JIDOSHA KABUSHIKI KAISHA, Toyota (JP)

(72) Inventors: Chung-Wei Lin, Mountain View, CA (US); Zhihao Jiang, Mountain View, CA (US)

(*) Notice: Subject to any disclaimer, the term of this patent is extended or adjusted under 35 U.S.C. 154(b) by 266 days.

(21) Appl. No.: 16/165,002

(22) Filed: Oct. 19, 2018

(65) Prior Publication Data
US 2020/0126415 A1 Apr. 23, 2020

(51) Int. Cl.
| G08G 1/0967 | (2006.01) |
| B60W 50/00 | (2006.01) |
| G08G 1/16 | (2006.01) |
| G05D 1/02 | (2020.01) |
| G08G 1/0962 | (2006.01) |
| B60W 50/14 | (2020.01) |

(52) U.S. Cl.
CPC ... *G08G 1/096725* (2013.01); *B60W 50/0097* (2013.01); *B60W 50/14* (2013.01); *G05D 1/0276* (2013.01); *G08G 1/09623* (2013.01); *G08G 1/166* (2013.01); *B60W 2050/146* (2013.01); *G05D 2201/0213* (2013.01)

(58) Field of Classification Search
CPC ......... G08G 1/096725; G08G 1/09623; G08G 1/166; G08G 1/052; G08G 1/0112; G08G 1/0133; G08G 1/081; G08G 1/096783; B60W 50/0097; B60W 50/14; G05D 1/0276
See application file for complete search history.

(56) References Cited

U.S. PATENT DOCUMENTS

| 2011/0260886 A1* | 10/2011 | Nagura | G08G 1/096783 340/905 |
| 2012/0059574 A1* | 3/2012 | Hada | G08G 1/0133 701/119 |
| 2014/0358841 A1* | 12/2014 | Ono | G08G 1/0129 706/52 |

* cited by examiner

*Primary Examiner* — Anne Marie Antonucci
*Assistant Examiner* — Andrew J Cromer
(74) *Attorney, Agent, or Firm* — Burbage Law, P.C.; Jon-Michael Burbage; Elizabeth Ruzich

(57) ABSTRACT

The disclosure includes embodiments for managing a flow of traffic through an intersection. In some embodiments, a method for a roadside device proximate to the intersection of a roadway includes retrieving twin data describing one or more digital behavioral twins of a vehicle present in a vicinity of the intersection. The method includes retrieving sensor data describing a driving context of the vehicle. The method includes modifying an operation of an Advanced Driver Assistance System (ADAS) of the vehicle to achieve managing the flow of traffic including the vehicle through the intersection based on the driving context and the one or more digital behavioral twins of the vehicle to improve safety and traffic efficiency within an intersection range.

20 Claims, 11 Drawing Sheets

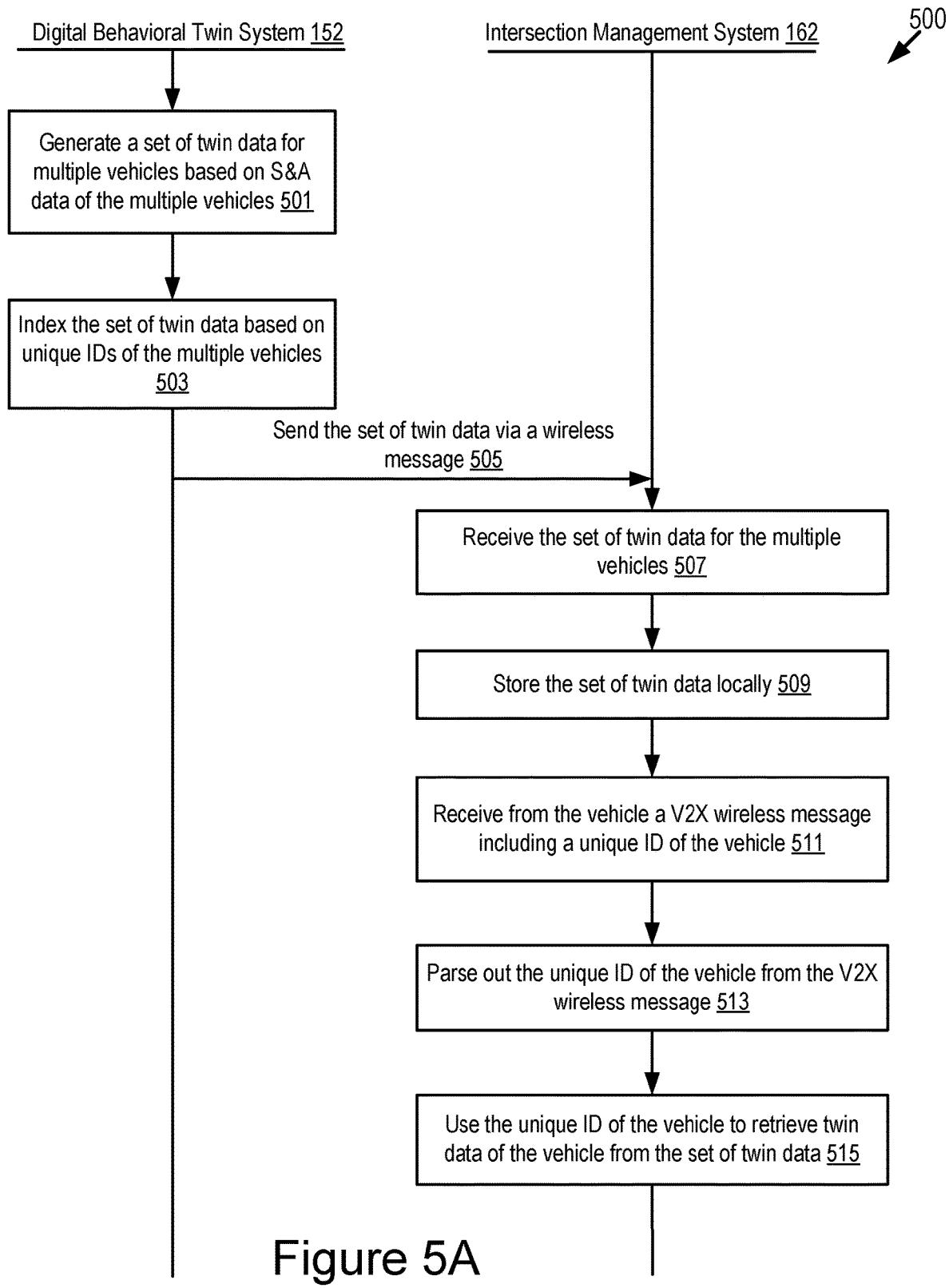

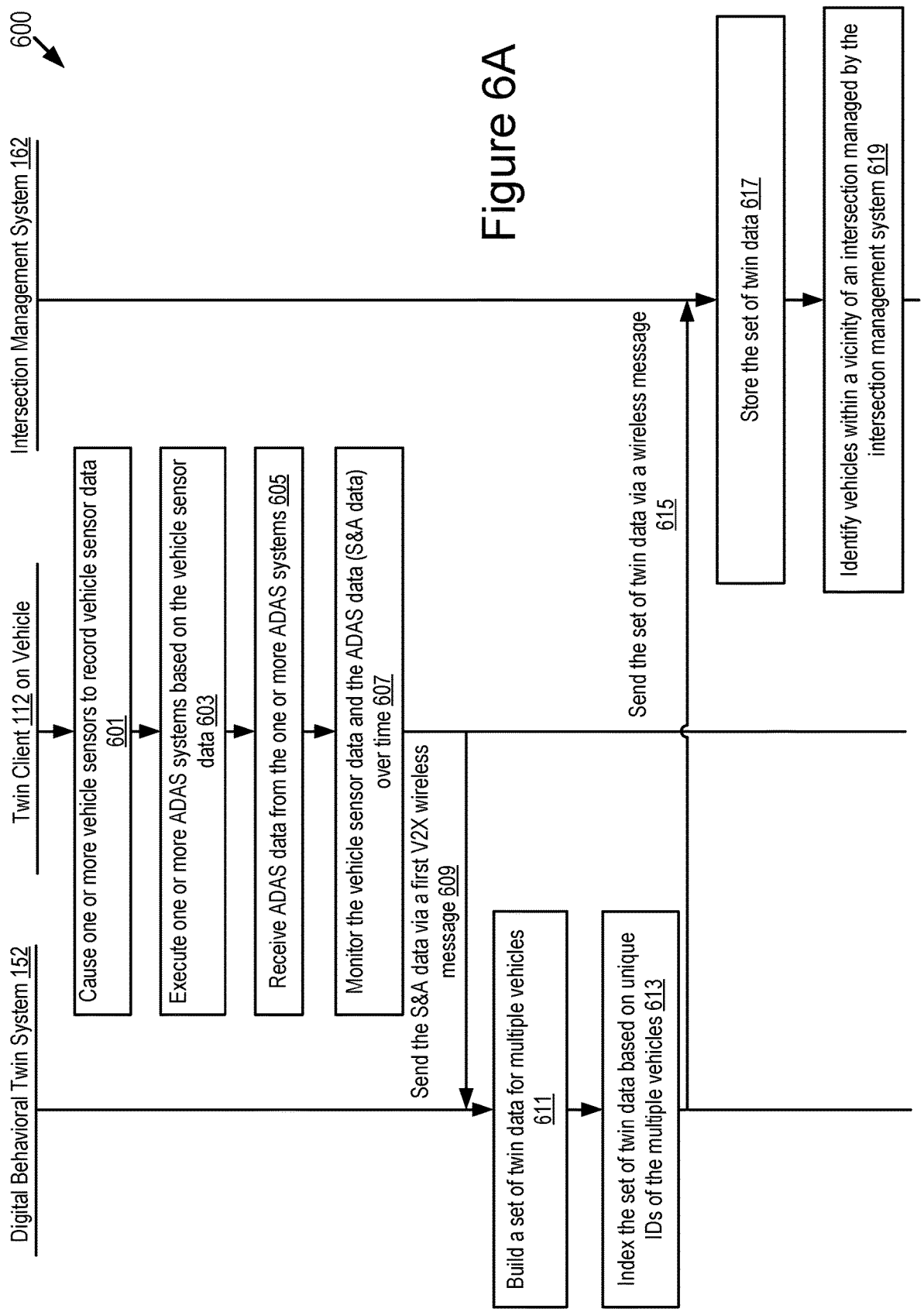

DIGITAL BEHAVIORAL TWIN SYSTEM FOR INTERSECTION MANAGEMENT IN CONNECTED ENVIRONMENTS

BACKGROUND

The specification relates to managing a flow of traffic through an intersection to improve safety, traffic efficiency, and human comfort.

It can be complicated to direct a flow of traffic through an intersection since, for example, various vehicles may travel toward the intersection from different directions simultaneously and intend to take different travel directions at the intersection. Besides, there may be pedestrians or bikers planning to cross roads at the intersection at the same time, which makes the management of the traffic at the intersection more difficult.

SUMMARY

Described are embodiments of: (1) a digital behavioral twin system stored on a cloud server; (2) an intersection management system stored on a roadside device (e.g., a roadside unit or some other infrastructure hardware having network communication capabilities); and (3) a twin client stored in an electronic control unit (ECU) of a connected vehicle.

The digital behavioral twin system includes software stored on a cloud server that aggregates vehicle sensor data from various vehicles in the real world. The twin client is an element of a vehicle and sends vehicle sensor data of the vehicle to the digital behavioral twin system of the cloud server on a regular basis. The vehicle sensor data describes the vehicle's own behavior, behaviors of other vehicles and one or more driving contexts for these behaviors. The vehicle sensor data also includes unique identification data for the vehicle (e.g., a unique identifier (ID) of the vehicle whose onboard sensors record the vehicle sensor data). The digital behavioral twin system generates one or more digital behavioral twins for each of these vehicles based on vehicle sensor data of these vehicles. The one or more digital behavioral twins of a vehicle are analyzable to predict a future behavior of the vehicle based on a corresponding driving context. Twin data of the vehicle is digital data that describes the one or more digital behavioral twins of the vehicle. The cloud server is operable to provide the twin data of the vehicle to the intersection management system.

The intersection management system includes software stored in a roadside device. The roadside device may be proximate to an intersection of a roadway and responsible for managing traffic including various vehicles through this intersection. The intersection management system stored in the roadside device provides an automated way to manage a flow of traffic through the intersection to improve safety, traffic efficiency and human comfort. For example, the intersection management system uses digital behavioral twins that are analyzable to predict future behaviors of vehicles that are known to be present at the intersection.

In some embodiments, the intersection management system retrieves twin data for each of the various vehicles in its vicinity. The intersection management system uses this twin data, as well as its local roadside sensor data describing current driving contexts for the various vehicles in its vicinity, to: (1) predict a behavior of each vehicle in the vicinity of the roadside device in a respective driving context of the vehicle based on the digital behavioral twins of the vehicle and a subset of roadside sensor data describing the respective driving context of the vehicle; and (2) manage a flow of traffic through the intersection based on the predicted behaviors of the various vehicles to improve safety, traffic efficiency and human comfort.

That is, the intersection management system described herein uses digital behavioral twins of vehicles that are known to be present at an intersection to predict future behaviors of these vehicles and to manage a flow of traffic through the intersection based on these predicted future behaviors. Using digital behavioral twins of vehicles that are known to be present at an intersection is advantageous because the intersection management system can use (1) local roadside sensor data that is used to determine current driving contexts for the vehicles that are present at the intersection and (2) the digital behavioral twins of the vehicles to accurately and quickly predict the future behaviors of the vehicles that are present at the intersection.

For example, the intersection management system can (1) predict if a particular vehicle tends to accelerate or decelerate in situations that are similar to the current driving context for the particular vehicle and (2) schedule a window for the particular vehicle to pass through the intersection accordingly. By comparison, existing solutions do not consider the use of digital behavioral twins for this purpose.

For example, the interaction management system can use one or more digital behavioral twins for a particular vehicle to predict if the particular vehicle tends to engage in a dangerous behavior (e.g., dangerously running or stopping at a yellow light) when experiencing a particular driving scenario which is currently present. The intersection management system can then use this information to prepare a safer management strategy for the flow of traffic through the intersection based on this known dangerous tendency of the particular vehicle, thereby reducing a risk posed to a driver of the particular vehicle as well as other drivers of other vehicles at the intersection. By comparison, existing solutions do not consider the use of digital behavioral twins for this purpose.

For example, there are no existing solutions that use digital behavioral twins of vehicles that are known to be present at an intersection to manage a flow of traffic through the intersection. Some examples of existing solutions are described here. A first example of the existing solutions provides a multi-agent approach to autonomous intersection management. A second example of the existing solutions provides advanced intersection management for connected vehicles using a multi-agent system approach. A third example of the existing solutions describes reliable intersection protocols using vehicular networks. A fourth example of the existing solutions provides a linear programming formulation for autonomous intersection control within a dynamic traffic assignment and connected vehicle environment. A fifth example of the existing solutions provides timing and security analysis of VANET-based intelligent transportation systems. However, these solutions do not consider the use of digital behavioral twins. Thus, these solutions are unable to predict a behavior of a vehicle before the behavior happens based on past behaviors of the vehicle in the same driving context (or driving scenario). FIG. 8 depicts example differences between the embodiments of the intersection management system described herein and the first, second, third, fourth and fifth examples of the existing solutions described above.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a roadside device proximate to an intersection of a roadway, including: retrieving twin data describing one or more digital behavioral twins of a vehicle present in a vicinity of the intersection; retrieving sensor data describing a driving context of the vehicle; and modifying an operation of an Advanced Driver Assistance System (ADAS) of the vehicle to achieve managing a flow of traffic including the vehicle through the intersection based on the driving context and the one or more digital behavioral twins of the vehicle to improve safety and traffic efficiency within an intersection range. Other embodiments of this aspect include corresponding computer systems, apparatus, and computer programs recorded on one or more computer storage devices, each configured to perform the actions of the methods.

Implementations may include one or more of the following features. The method where modifying the operation of the ADAS of the vehicle to achieve managing the flow of traffic including the vehicle through the intersection includes: generating prediction data describing a predicted driving behavior of the vehicle within the driving context based on the one or more digital behavioral twins of the vehicle and the sensor data describing the driving context; and modifying the operation of the ADAS of the vehicle to achieve managing the flow of traffic including the vehicle through the intersection based on the predicted driving behavior of the vehicle. The method where modifying the operation of the ADAS of the vehicle to achieve managing the flow of traffic including the vehicle through the intersection based on the predicted driving behavior of the vehicle further includes: analyzing the predicted driving behavior of the vehicle to determine control data for processing the vehicle through the intersection so that the flow of traffic through the intersection is maximized while a risk of a collision within the intersection range is minimized; and sending a wireless message including the control data to the vehicle so that the operation of the ADAS of the vehicle is modified based on the control data. The method where the control data controls the operation of the ADAS of the vehicle through the intersection so that the vehicle is operated in a manner conforming to the control data. The method where the control data further controls an electronic display of the vehicle to display a graphical output that visually depicts one or more driving instructions for controlling the operation of the ADAS of the vehicle. The method where the control data describes a time window when the vehicle enters the intersection and a behavior that the vehicle assumes when entering the intersection. The method where the behavior that the vehicle assumes when entering the intersection includes one or more of: a speed of the vehicle; an acceleration or a deceleration of the vehicle; a lane on which the vehicle travels; a travelling direction of the vehicle; and a turn that the vehicle takes at the intersection. The method further including: receiving a set of twin data for multiple vehicles from a digital behavioral twin system, where the set of twin data is indexed based on unique identifiers (IDs) of the multiple vehicles; storing the set of twin data locally by the roadside device; and receiving, from the vehicle, a Vehicle-to-Everything (V2X) wireless message including a unique ID of the vehicle; parsing out the unique ID of the vehicle from the V2X wireless message; and using the unique ID of the vehicle to retrieve the twin data of the vehicle from the set of twin data. The method where a set of twin data for multiple vehicles is generated and stored by a digital behavioral twin system and indexed based on unique identifiers (IDs) of the multiple vehicles, and retrieving the twin data describing the one or more digital behavioral twins of the vehicle includes: receiving a Vehicle-to-Everything (V2X) wireless message from the vehicle; parsing out a unique ID of the vehicle from the V2X wireless message; sending a first wireless message including the unique ID to the digital behavioral twin system so that the digital behavioral twin system uses the unique ID of the vehicle to retrieve the twin data of the vehicle from the set of twin data; and receiving a second wireless message including the twin data from the digital behavioral twin system. The method where the twin data of the vehicle is generated by a digital behavioral twin system and sent to the vehicle for storage by the digital behavioral twin system and retrieving the twin data describing the one or more digital behavioral twins of the vehicle includes: receiving a Vehicle-to-Everything (V2X) wireless message including the twin data from the vehicle. The method where the intersection range includes a region that covers the intersection and that is within a predetermined distance before and after the intersection in one or more directions. Implementations of the described techniques may include hardware, a method or process, or computer software on a computer-accessible medium.

One general aspect includes a system including a processor and a non-transitory memory storing computer code which, when executed by the processor, causes the processor to: retrieve twin data describing one or more digital behavioral twins of a vehicle present in a vicinity of the intersection; retrieve sensor data describing a driving context of the vehicle; and modify an operation of an Advanced Driver Assistance System (ADAS) of the vehicle to achieve managing a flow of traffic including the vehicle through the intersection based on the driving context and the one or more digital behavioral twins of the vehicle to improve safety and traffic efficiency within an intersection range. Other embodiments of this aspect include corresponding computer systems, apparatus, and computer programs recorded on one or more computer storage devices, each configured to perform the actions of the methods.

Implementations may include one or more of the following features. The system where the computer code which, when executed by the processor, causes the processor to modify the operation of the ADAS of the vehicle to achieve managing the flow of traffic including the vehicle through the intersection at least by: generating prediction data describing a predicted driving behavior of the vehicle within the driving context based on the one or more digital behavioral twins of the vehicle and the sensor data describing the driving context; and modifying the operation of the ADAS of the vehicle to achieve managing the flow of traffic including the vehicle through the intersection based on the predicted driving behavior of the vehicle. The system where the computer code which, when executed by the processor, causes the processor to modify the operation of the ADAS of the vehicle to achieve managing the flow of traffic including the vehicle through the intersection based on the predicted driving behavior of the vehicle at least by: analyzing the predicted driving behavior of the vehicle to determine control data for processing the vehicle through the intersection so that the flow of traffic through the intersection is maximized while a risk of a collision within the intersection range is minimized; and sending a wireless message including the control data to the vehicle so that the operation of the ADAS of the vehicle is modified based on the control data. The system where the control data controls the operation of the ADAS of the vehicle through the intersection so that the vehicle is operated in a manner conforming to the control data. The system where the control data further controls an electronic display of the vehicle to display a graphical output that visually depicts one or more driving instructions for controlling the operation of the ADAS of the vehicle. The system where the control data describes a time window when the vehicle enters the intersection and a behavior that the vehicle assumes when entering the intersection. The system where the behavior that the vehicle assumes when entering the intersection includes one or more of: a speed of the vehicle; an acceleration or a deceleration of the vehicle; a lane on which the vehicle travels; a travelling direction of the vehicle; and a turn that the vehicle takes at the intersection. Implementations of the described techniques may include hardware, a method or process, or computer software on a computer-accessible medium.

One general aspect includes a computer program product including a non-transitory memory storing computer-executable code that, when executed by a processor, causes the processor to: retrieve twin data describing one or more digital behavioral twins of a vehicle present in a vicinity of the intersection; retrieve sensor data describing a driving context of the vehicle; and modify an operation of an Advanced Driver Assistance System (ADAS) of the vehicle to achieve managing a flow of traffic including the vehicle through the intersection based on the driving context and the one or more digital behavioral twins of the vehicle to improve safety and traffic efficiency within an intersection range. Other embodiments of this aspect include corresponding computer systems, apparatus, and computer programs recorded on one or more computer storage devices, each configured to perform the actions of the methods.

Implementations may include one or more of the following features. The computer program product where the computer code that, when executed by the processor, causes the processor to modify the operation of the ADAS of the vehicle to achieve managing the flow of traffic including the vehicle through the intersection at least by: generating prediction data describing a predicted driving behavior of the vehicle within the driving context based on the one or more digital behavioral twins of the vehicle and the sensor data describing the driving context; and modifying the operation of the ADAS of the vehicle to achieve managing the flow of traffic including the vehicle through the intersection based on the predicted driving behavior of the vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 5A depicts a process for retrieving twin data describing one or more digital behavioral twins of a vehicle according to some embodiments.

FIGS. 6A-6B depicts an example process for managing a flow of traffic through an intersection according to some embodiments.

DETAILED DESCRIPTION

Figure 1:
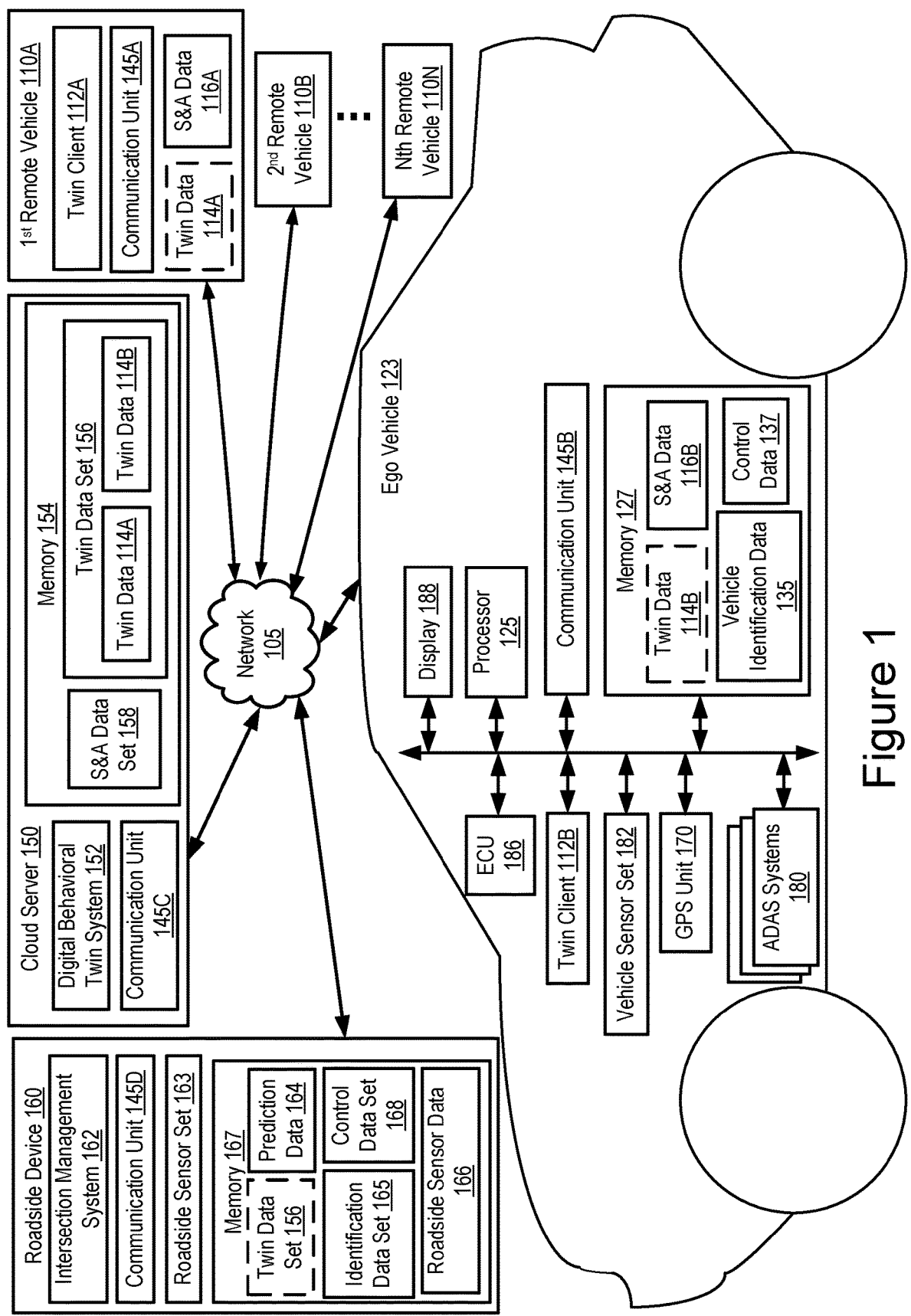
FIG. 1 is a block diagram illustrating an operating environment for an intersection management system according to some embodiments.

There are many different connected intersection management systems. Unfortunately, these existing solutions are unable to accurately predict future behaviors of specific drivers based on their past historic behaviors and to manage an intersection of a roadway based on these past behaviors of specific drivers. Embodiments described herein consider using digital behavioral twins of specific drivers to manage a flow of traffic through an intersection. None of the existing solutions considers the use of digital behavioral twins to manage the flow of traffic through an intersection. Accordingly, at least one benefit of the embodiments described herein includes using digital behavioral twins to manage a flow of traffic through an intersection. Other example benefits are discussed below.

Embodiments described herein include three components: (1) a digital behavioral twin system stored on a cloud server; (2) an intersection management system stored in a roadside device (e.g., a roadside unit or some other infrastructure hardware having network communication capabilities); and (3) a twin client stored in an electronic control unit (ECU) of a connected vehicle.

The digital behavioral twin system includes software stored on a cloud server that aggregates vehicles sensor data for vehicles in the real world. The vehicle sensor data from a vehicle describes behaviors of the vehicle, behaviors of other vehicles observed by the vehicle, driving contexts for these behaviors and unique identification data for each of the vehicles.

Assume that a roadway environment includes: (1) an ego vehicle; and (2) a set of remote vehicles. The ego vehicle is a connected vehicle that includes a twin client. The remote vehicles may or may not be connected vehicles. The remote vehicles may or may not include a twin client. A driver of the ego vehicle is referred to as an "ego driver," whereas a driver of a remote vehicle is referred to as a "remote driver."

The twin client includes software stored in the ECU of the ego vehicle (and optionally one or more of the remote vehicles). The ego vehicle includes a set of vehicle sensors and a set of Advanced Driver-Assistance Systems ("ADAS systems" if plural, "ADAS system" if singular). The vehicle sensors and ADAS systems record digital data that describe: (1) a behavior of the ego driver of the ego vehicle, as well as a driving context for this behavior (i.e., events occurring before, during or perhaps after the driving behavior; time of day; day of week; weather conditions; whether the environmental conditions are urban or rural, etc.); (2) a behavior of the remote driver(s) of the remote vehicle(s), as well as a driving context for this behavior; and (3) unique identification data of the ego vehicle (e.g., a VIN number) and unique identification data of the remote vehicles (e.g., license plate information such as a license plate number and state, province, commonwealth or other jurisdiction that issues the license plate). This digital data is referred to herein as sensor data and ADAS data (referred to as "S&A data"). The twin client of the ego vehicle uses a form of Vehicle-to-Everything (V2X) communications to transmit a wireless message including the S&A data to the digital behavioral twin system of the cloud server via a wireless network. In this way, the digital behavioral twin system receives digital data describing the driving behaviors of both connected vehicles (e.g., the ego vehicle) and unconnected vehicles (e.g., the remote vehicles) as well as the driving contexts for these behaviors.

Examples of V2X communications described herein include, but are not limited to, one or more of the following: Dedicated Short Range Communication (DSRC) (including Basic Safety Messages (BSMs) and Pedestrian Safety Messages (PSMs), among other types of DSRC communication); Long-Term Evolution (LTE); millimeter wave (mmWave) communication; 3G; 4G; 5G; LTE-V2X; LTE-Vehicle-to-Vehicle (LTE-V2V); LTE-Device-to-Device (LTE-D2D); Voice over LTE (VoLTE); etc.

The roadway environment may include various ego vehicles, so that the digital behavioral twin system receives multiple instances of S&A data from various connected vehicles to form an S&A data set. However, for the purpose of clarity and simplicity, a single ego vehicle is now described without loss of generality. Each instance of S&A data received by the cloud server includes a unique identifier (ID) of the vehicle whose sensors and ADAS systems generate the S&A data. In this way, the S&A data set may be indexed (or indexable) based on the unique IDs of the vehicles that generate the S&A data included in the S&A data set.

The digital behavioral twin system generates digital behavioral twins for the ego vehicle and the remote vehicles using the data included in the S&A data set. The digital behavioral twins of a vehicle are analyzable to predict a future behavior of the vehicle based on the vehicle's current driving context. Twin data is digital data that describes one or more digital behavioral twins. The cloud server is operable to provide the twin data to an intersection management system.

The intersection management system includes software stored in a roadside device (e.g., a roadside unit) that is responsible for managing the flow of traffic through an intersection. The roadside device includes a communication unit. The communication unit includes a DSRC radio. Some of the vehicles in the vicinity of the intersection, such as the ego vehicle, also include a DSRC radio and regularly transmit DSRC messages, including Basic Safety Messages (BSMs), at a regular interval (e.g., once every 0.10 seconds) that is user configurable. Each of these DSRC messages includes a unique ID of a corresponding vehicle that transmits the DSRC message. This unique ID is the same as identification data included in the S&A data that is provided to the cloud server. The intersection management system receives a plurality of DSRC messages from DSRC-enabled vehicles that are within a DSRC transmission range of the roadside device. The intersection management system stores the plurality of DSRC messages (or the digital data that they contain) in a DSRC message set. The DSRC transmission range is about 500 meters depending on variables such as the presence of obstructions. Because the DSRC messages include digital data describe the unique IDs of the vehicles that transmit the DSRC messages, the receipt of these DSRC messages serves as a means for the intersection management system to discover the identities of the vehicles (or at least the DSRC-enabled vehicles) that are within the vicinity of the intersection (e.g., 500 meters) which is managed by the roadside device that includes the intersection management system.

The intersection management system is further described below with reference to FIGS. 1-6B.

Example Overview

Referring to FIG. 1, depicted is an operating environment 100 for an intersection management system 162, a twin client 112 and a digital behavioral twin system 152. The operating environment 100 may include one or more of the following elements: one or more remote vehicles 110 (e.g., a first remote vehicle 110A, a second remote vehicle 110B and an Nth remote vehicle 110N which are referred herein as "remote vehicle 110" individually or collectively); an ego vehicle 123; a cloud server 150; and a roadside device 160. These elements of the operating environment 100 may be communicatively coupled to a network 105.

Although three remote vehicles 110, one ego vehicle 123, one cloud server 150, one roadside device 160 and one network 105 are depicted in FIG. 1, in practice the operating environment 100 may include one or more remote vehicles 110, one or more ego vehicles 123, one or more cloud servers 150, one or more roadside devices 160 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I; LTE-V2X, LTE-D2D, VoLTE, LTE-5G or any other mobile data network or combination of mobile data networks. Further, the network 105 may include one or more IEEE 802.11 wireless networks.

In some embodiments, one or more of the ego vehicle 123 and the remote vehicle 110 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

In some embodiments, devices other than vehicles (e.g., the roadside device 160) may be DSRC-equipped. For example, a roadside unit (RSU) or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

As used herein, the words "geographic location," "location," "geographic position" and "position" refer to a latitude and longitude of an object such as the roadside device 160, the ego vehicle 123 or the remote vehicle 110. The example embodiments described herein provide positioning information that describes a geographic position of a vehicle with an accuracy of at least plus or minus 1.5 meters in relation to the actual geographic position of the vehicle. Accordingly, the example embodiments described herein are able to describe the geographic position of the vehicle with lane-level accuracy or better.

The ego vehicle 123 and the remote vehicle 110 may include the same or similar elements. The ego vehicle 123 and the remote vehicle 110 may share a connection or association. For example, the ego vehicle 123 and the remote vehicle 110 may share a common manufacturer (e.g., Toyota). In another example, these vehicles each include a communication unit such that these vehicles are "connected vehicles," where the communication unit includes any hardware and software that is needed to enable the corresponding vehicle to communicate with other entities of the operating environment 100 via a wireless network. The wireless network is a communication network that enables entities such as the vehicles, the cloud server 150 and the roadside device 160 to wirelessly communicate with one another via one or more of the following: Wi-Fi; cellular including 3G, 4G, LTE, 5G, etc.; DSRC; millimeter wave communication; etc.

The ego vehicle 123 and the remote vehicle 110 may be any type of vehicle. The ego vehicle 123 and the remote vehicle 110 may be the same type of vehicle relative to one another or different types of vehicles relative to one another. For example, either the ego vehicle 123 or the remote vehicle 110 may include one of the following types of vehicles: a car; a truck; a sports utility vehicle; a bus; a semi-truck; a drone or any other roadway-based conveyance.

In some embodiments, one or more of the ego vehicle 123 and the remote vehicle 110 may include an autonomous vehicle or a semi-autonomous vehicle. For example, one or more of the ego vehicle 123 and the remote vehicle 110 may include one or more ADAS systems 180. The one or more ADAS systems 180 may provide some or all of the functionality that provides autonomous functionality.

The remote vehicle 110 includes, among other things, one or more of the following elements communicatively coupled to one another via a bus: a processor (not shown in the figure); a memory (not shown in the figure); a communication unit 145A; a GPS unit (not shown in the figure); a vehicle sensor set (not shown in the figure); and a twin client 112A. In some embodiments, the remote vehicle 110 may also include an ADAS system.

In some embodiments, S&A data 116A is stored in the memory of the remote vehicle 110. The S&A data 116A includes vehicle sensor data and ADAS data generated by the remote vehicle 110. Optionally, twin data 114A is stored in the memory of the remote vehicle 110. The twin data 114A includes data describing one or more digital behavioral twins of the remote vehicle 110.

The communication unit 145A transmits and receives data to and from a network 105 or to another communication channel. In some embodiments, the communication unit 145A may include a DSRC transceiver, a DSRC receiver and other hardware or software necessary to make the remote vehicle 110 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The ego vehicle 123 may include one or more of the following elements: a processor 125; a memory 127; a communication unit 145B; a GPS unit 170; one or more ADAS systems 180; a vehicle sensor set 182; a display 188; an ECU 186; and a twin client 112B. These elements of the ego vehicle 123 may be communicatively coupled to one another via a bus.

In some embodiments, the processor 125 and the memory 127 may be elements of an onboard vehicle computer system. The onboard vehicle computer system may be operable to cause or control the operation of the twin client 112B. The onboard vehicle computer system may be operable to access and execute the data stored on the memory 127 to provide the functionality described herein for the twin client 112B.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 and the remote vehicle 110 may each include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 and the remote vehicle 110 may each include one or more memories 127.

The memory 127 of the ego vehicle 123 may store one or more of the following elements: S&A data 116B; vehicle identification data 135; and control data 137. Optionally, the memory 127 also stores twin data 114B of the ego vehicle 123.

The S&A data 116B can include vehicle sensor data and ADAS data generated by the ego vehicle 123. The S&A data 116B of the ego vehicle 123 and the S&A data 116A of the remote vehicle 110 may be similar to one another and referred to as "S&A data 116" individually or collectively.

In some embodiments, the ego vehicle 123 (or the remote vehicle 110) includes various vehicle sensors that record their surrounding environment and an environment internal to a cabin of the vehicle. The vehicle sensors include any onboard sensors of the vehicle which monitor the environment of the vehicle whether internally or externally. For example, the vehicle includes cameras, LIDAR, radars, infrared sensors, and sensors that observe the ego (or remote) driver's behavior such as internal cameras, biometric sensors, etc. The vehicle sensor data of the vehicle is digital data that describes one or more sensor measurements recorded by these sensors of the vehicle. The vehicle sensor data may be inputted to the one or more ADAS systems 180 of the vehicle so that they may provide their functionality. For example, the one or more ADAS systems 180 perceive the environment of the vehicle and determine vehicular responses to the environment. The ADAS data of the vehicle is digital data that describes an analysis of the one or more ADAS systems 180 and the vehicular responses. Examples of the one or more ADAS systems 180 are described below.

The vehicle identification data 135 of the ego vehicle 123 includes unique identification data of the ego vehicle 123. For example, the vehicle identification data 135 includes: a vehicle ID; a license plate number and state, province, commonwealth, or other jurisdiction that issues the license plate; or any other data used to identify the ego vehicle 123.

The control data 137 of the ego vehicle 123 includes data for controlling an operation of the ego vehicle 123. For example, the control data 137 includes data describing how to process the ego vehicle 123 through an intersection. In another example, the control data 137 includes data for controlling an operation of the one or more ADAS systems 180 of the ego vehicle 123 so that the ego vehicle 123 is operated in a manner conforming to the control data 137 through the intersection.

In some embodiments, the control data 137 includes data describing a time window when the ego vehicle 123 enters the intersection and a behavior that the ego vehicle 123 assumes when entering the intersection, where the behavior that the ego vehicle 123 assumes when entering the intersection includes one or more of: a speed of the ego vehicle 123; an acceleration or a deceleration of the ego vehicle 123; a lane on which the ego vehicle 123 travels; a travelling direction of the ego vehicle 123; and a turn that the ego vehicle 123 takes at the intersection, etc.

The twin data 114B of the ego vehicle 123 includes data describing one or more digital behavioral twins of the ego vehicle 123. The twin data 114B of the ego vehicle 123 and the twin data 114A of the remote vehicle 110 may be similar to one another and referred to as "twin data 114" individually or collectively.

In some embodiments, a digital behavioral twin for the ego vehicle 123 describes, for example: (1) different driving scenarios and how the ego driver would respond in these driving scenarios; and (2) different complex patterns of behavior for the ego driver that are inherently difficult to predict. In some embodiments, a driving scenario may also be referred to as a driving context without ambiguity.

Examples of complex patterns of behavior that are described by the digital behavioral twin include, but are not limited to, the following items (1)-(6):

(1) If the traffic light has turned yellow, how likely is it that the ego driver will begin accelerating and speed through the yellow traffic light?
(2) If the traffic light has turned yellow, how likely is it that the ego driver will begin accelerating and speed through the traffic light even after it has turned red?
(3) If the traffic light has turned yellow, how likely is it that the ego driver will begin accelerating and then regret his/her decision and try to hard brake at the last moment to stop for the traffic light?
(4) How quickly will the ego driver begin to accelerate after a traffic light turns green?

(5) If the ego driver hard brakes (in any situation, not just one involving traffic lights), then how likely is it that there is a traffic accident ahead of the ego driver?

(6) Any other pattern of driver behaviors.

The communication unit 145B of the ego vehicle 123 may have a structure similar to that of the communication unit 145A of the remote vehicle 110 and provides functionality similar to that of the communication unit 145A. Similar description for the communication unit 145B is not repeated here.

Examples of the one or more ADAS systems 180 included in the ego vehicle 123 include one or more of the following: an automatic cruise control (ACC) system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (sometimes referred to as a lane keep assistant); a pedestrian protection system; a traffic sign recognition system; a turning assistant; and a wrong-way driving warning system. The features and functionality provided by these example ADAS systems are also referred to herein as an "autonomous feature" or an "autonomous functionality," respectively. In practice, the onboard systems include any vehicle feature having functionality which allows it to monitor and track the operational data and the route data, and not just ADAS systems.

In some embodiments, the one or more ADAS systems 180 include any hardware or software that controls one or more operations of the ego vehicle 123 so that the ego vehicle 123 is "autonomous" or "semi-autonomous."

In some embodiments, the GPS unit 170 is a conventional GPS unit of the ego vehicle 123. For example, the GPS unit 170 may include hardware that wirelessly communicates with a GPS satellite to retrieve data that describes a geographic location of the ego vehicle 123. For example, the GPS unit 170 retrieves GPS data from one or more GPS satellites. In some embodiments, the GPS unit 170 is a DSRC-compliant GPS unit of the ego vehicle 123 that is operable to provide GPS data describing the geographic location of the ego vehicle 123 with lane-level accuracy.

The vehicle sensor set 182 includes one or more sensors that are operable to measure the roadway environment outside of the ego vehicle 123. For example, the vehicle sensor set 182 may include one or more sensors that record one or more physical characteristics of the road environment that is proximate to the ego vehicle 123. The memory 127 may store sensor data that describes the one or more physical characteristics recorded by the vehicle sensor set 182. The roadway environment outside of the ego vehicle 123 may include the remote vehicle 110, and so, one or more of the sensors of the vehicle sensor set 182 may record sensor data that describes information about the remote vehicle 110.

In some embodiments, the vehicle sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 is an embedded system in automotive electronics that controls one or more of electrical systems or subsystems in the ego vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ECU 186 is configured to control operations of the ADAS systems 180, sensors in the vehicle sensor set 182 and the twin client 112 of the ego vehicle 123. In some embodiments, the ego vehicle 123 may include multiple ECUs 186.

The display 188 may be a display device of the ego vehicle 123. For example, the display 188 is a liquid crystal display (LCD) device or a light emitting diode (LED) display device. In some embodiments, the display 188 is integrated with a touch function.

The twin client 112B of the ego vehicle 123 and the twin client 112A of the remote vehicle 110 may be similar to one another and provide similar functionality. The twin client 112A and the twin client 112B are referred to as "twin client 112" individually or collectively.

In some embodiments, the twin client 112 of the ego vehicle 123 (or the remote vehicle 110) includes software that is operable, when executed by the processor 125, to cause the processor 125 to generate S&A data associated with the vehicle. For example, the twin client 112 causes one or more vehicle sensors of the vehicle to record vehicle sensor data. The twin client 112 executes the one or more ADAS systems 180 of the vehicle based on the vehicle sensor data and receives ADAS data from the one or more ADAS systems 180. The twin client 112 monitors the vehicle sensor data and the ADAS data over time to generate the A&S data and sends the A&S data to the digital behavioral twin system 152 using a form of V2X communications.

In some embodiments, the twin client 112 of the ego vehicle 123 (or the remote vehicle 110) includes software that is operable, when executed by the processor 125, to modify an operation of the vehicle. For example, the twin client 112 receives control data for controlling an operation of the vehicle from the roadside device 160. The twin client 112 modifies an operation of the one or more ADAS systems 180 of the vehicle so that the vehicle is operated in a manner conforming to the corresponding control data. For example, while passing through the intersection, the vehicle is operated with a speed specified in the control data and on a lane that is also specified in the control data.

In some embodiments, the twin client 112 may be implemented using hardware including a field-programmable gate array ("FPGA") or an application-specific integrated circuit ("ASIC"). In some other embodiments, the twin client 112 may be implemented using a combination of hardware and software. The twin client 112 may be stored in a combination of the devices (e.g., servers or other devices), or in one of the devices.

The twin client 112 is further described below with reference to FIGS. 5C-6B.

The cloud server 150 is a computing device including one or more processors and one or more memories. The cloud server 150 includes one or more of the following elements: a processor (not shown in the figure); a memory 154; a communication unit 145C; and a digital behavioral twin system 152.

The communication unit 145C may have a structure similar to the communication unit 145A of the remote vehicle 110 or the communication unit 145B of the ego vehicle 123 and may provide functionality similar to that of the communication unit 145A or the communication unit 145B. Similar description for the communication unit 145C is not repeated here.

The memory 154 of the cloud server 150 may have a structure similar to the memory 127 of the ego vehicle 123 and provide functionality similar to that of the memory 127 of the ego vehicle 123. Similar description for the memory 154 is not repeated here.

In some embodiments, the memory 154 stores one or more of an S&A data set 158 and a twin data set 156.

The S&A data set 158 includes S&A data 116 from various vehicles. For example, the S&A data set 158 includes the S&A data 116A from the remote vehicle 110 and the S&A data 116B from the ego vehicle 123. In some embodiments, the digital behavioral twin system 152 aggregates S&A data from different vehicles to form the S&A data set 158.

The twin data set 156 includes twin data 114 for various vehicles. For example, the twin data set 156 includes the twin data 114A for the remote vehicle 110 and the twin data 114B for the ego vehicle 123. In some embodiments, the digital behavioral twin system 152 generates twin data 114 describing one or more digital behavioral twins for a vehicle based on the S&A data 116 of the vehicle, and then includes the twin data 114 of the vehicle as an entry in the twin data set 156. An instance of the twin data 114 includes all the digital data that is needed to generate a particular digital behavioral twin. In some embodiments, an instance of the twin data 114 includes model parameters for the digital behavioral twin described by the twin data 114.

The digital behavioral twin system 152 includes software that is operable, when executed by the processor of the cloud server 150, to cause the processor of the cloud server 150 to create twin data for a vehicle based on S&A data of the vehicle. For example, the digital behavioral twin system 152 receives the S&A data from the vehicle (e.g., via a V2X wireless message) and creates the twin data for the vehicle using the S&A data of the vehicle. By performing similar operations, the digital behavioral twin system 152 can create a set of twin data for a set of vehicles and stores the set of twin data in the twin data set 156.

In some embodiments, the S&A data transmitted from each vehicle also includes vehicle identification data of the corresponding vehicle (e.g., a unique ID of the vehicle). The digital behavioral twin system 152 indexes the S&A data of the vehicle in the S&A data set 158 using the unique ID of the vehicle. In this way, S&A data from different vehicles is searchable in the S&A data set 158 using the unique IDs of the vehicles.

Similarly, the digital behavioral twin system 152 indexes twin data of a vehicle in the twin data set 156 using a unique ID of the vehicle. In this way, twin data for different vehicles is searchable in the twin data set 156 using unique IDs of the vehicles.

In some embodiments, the digital behavioral twin system 152 may be implemented using hardware including an FPGA or an ASIC. In some other embodiments, the digital behavioral twin system 152 may be implemented using a combination of hardware and software. The digital behavioral twin system 152 may be stored in a combination of the devices (e.g., servers or other devices), or in one of the devices.

The digital behavioral twin system 152 is further described below with reference to FIGS. 5A-6B.

The roadside device 160 can be a computing device located proximate to a roadway. For example, the roadside device 160 is a roadside unit or some other roadside infrastructure device having network communication capabilities.

In some embodiments, the roadside device 160 includes one or more of the following elements: a processor (not shown in FIG. 1); an intersection management system 162; a communication unit 145D; a roadside sensor set 163; and a memory 167.

The communication unit 145D may have a structure similar to the communication unit 145A of the remote vehicle 110, the communication unit 145B of the ego vehicle 123 or the communication unit 145C of the cloud server 150 and may provide a functionality similar to that of the communication unit 145A, the communication unit 145B or the communication unit 145C. Similar description for the communication unit 145D is not repeated here. The communication unit 145A, the communication unit 145B, the communication unit 145C and the communication unit 145D can be referred herein as "communication unit 145" individually or collectively.

The memory 167 of the roadside device 160 may have a structure similar to the memory 127 of the ego vehicle 123 and provide functionality similar to that of the memory 127 of the ego vehicle 123. Similar description for the memory 167 is not repeated here.

In some embodiments, the memory 167 stores one or more of the following elements: prediction data 164; identification data set 165; control data set 168; and roadside sensor data 166. Optionally, the memory 167 stores the twin data set 156 or a subset of the twin data set 156 received from the cloud server 150.

The identification data set 165 includes vehicle identification data of vehicles that are in the vicinity of an intersection managed by the roadside device 160. For example, the identification data set 165 includes vehicle IDs of the vehicles proximate to the intersection.

The roadside sensor data 166 includes sensor data recorded by one or more sensors of the roadside device 160. In some embodiments, based on the roadside sensor data 166, the intersection management system 162 determines one or more driving contexts of one or more vehicles that are in the vicinity of an intersection managed by the roadside device 160.

The prediction data 164 includes digital data describing predicted driving behaviors of various vehicles in the vicinity of an intersection managed by the roadside device 160. For example, for each of the vehicles within the vicinity of the intersection, the prediction data 164 includes digital data describing how the corresponding vehicle may behave in a driving context of the corresponding vehicle.

The control data set 168 includes a set of control data for controlling operations of a set of vehicles through an intersection respectively. For example, for each vehicle in the vicinity of the intersection, the control data set 168 includes corresponding control data for modifying an operation of the ADAS system 180 of the vehicle so that the vehicle is operated in a manner conforming to the corresponding control data through the intersection.

The roadside sensor set 163 includes one or more sensors that are operable to measure a roadway environment proximate to the roadside device 160. The roadway environment proximate to the roadside device 160 may include one or more vehicles (e.g., the remote vehicle 110, the ego vehicle 123), and so, one or more sensors of the roadside device 160 may record roadside sensor data that describes information about the one or more vehicles such as driving contexts for the one or more vehicles.

In some embodiments, the roadside sensor set 163 may include one or more of the following roadside sensors: a camera; a LIDAR sensor; a radar sensor; a laser altimeter; an infrared detector; a motion detector; a thermostat; a sound detector, a curb feeler; a defect detector; a radar gun; a speed sensor; and any other type of roadside sensor.

The intersection management system 162 includes software that is operable, when executed by the processor of the roadside device 160, to cause the processor of the roadside device 160 to execute one or more steps of methods 300 and 400 and example processes 500, 520, 550 and 600 described below with reference to FIGS. 3-6B. In some embodiments, the intersection management system 162 uses digital behavioral twins of connected vehicles to manage a flow of traffic through an intersection based on: (1) twin data that describes the digital behavioral twins of the connected vehicles; and (2) sensor data that describes the driving context(s) for the connected vehicles. The intersection management system 162 is particularly beneficial for controlling traffic through an intersection to improve safety, traffic efficiency and human comfort.

In some embodiments, the intersection management system 162 may be implemented using hardware including an FPGA or an ASIC. In some other embodiments, the intersection management system 162 may be implemented using a combination of hardware and software. The intersection management system 162 may be stored in a combination of the devices (e.g., servers or other devices), or in one of the devices.

The intersection management system 162 is further described below in more details.

Example Computer System

Figure 2:
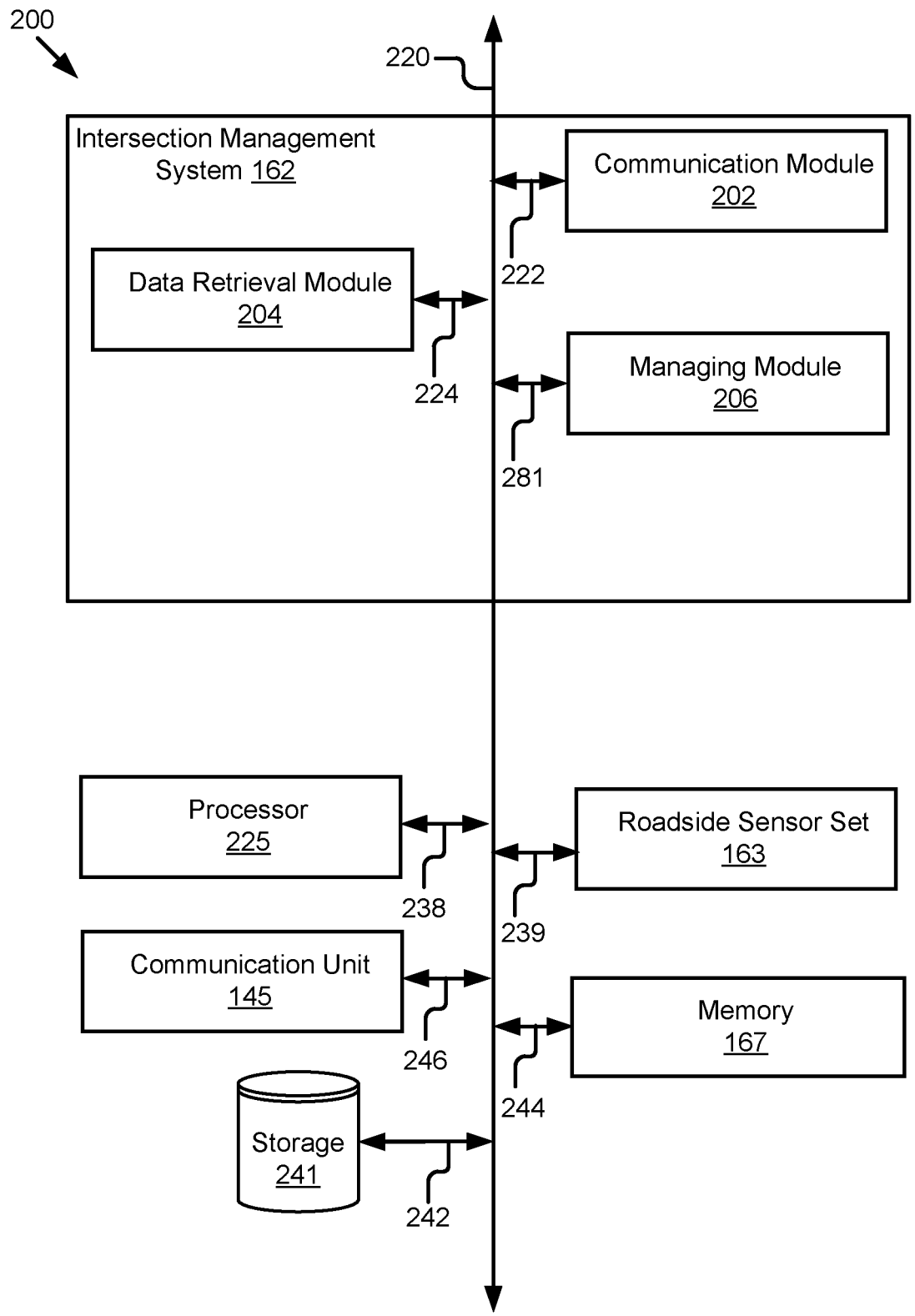
FIG. 2 is a block diagram illustrating an example computer system including an intersection management system according to some embodiments.

Referring now to FIG. 2, depicted is a block diagram illustrating an example computer system 200 including the intersection management system 162 according to some embodiments. In some embodiments, the computer system 200 may include a special-purpose computer system that is programmed to perform one or more steps of methods 300 and 400 described below with reference to FIGS. 3-4 and processes 500, 520, 550 and 600 described below with reference to FIGS. 5A-6B.

In some embodiments, the computer system 200 may be an element of the roadside device 160. For example, the computer system 200 may be a processor-based computing device of the roadside device 160.

The computer system 200 may include one or more of the following elements according to some examples: the intersection management system 162; a processor 225; the communication unit 145; the roadside sensor set 163; the memory 167; and a storage 241. The components of the computer system 200 are communicatively coupled by a bus 220.

In the illustrated embodiment, the processor 225 is communicatively coupled to the bus 220 via a signal line 238. The communication unit 145 is communicatively coupled to the bus 220 via a signal line 246. The roadside sensor set 163 is communicatively coupled to the bus 220 via a signal line 239. The storage 241 is communicatively coupled to the bus 220 via a signal line 242. The memory 167 is communicatively coupled to the bus 220 via a signal line 244.

The following elements of the computer system 200 are described above with reference to FIG. 1, and so, those descriptions will not be repeated here: the communication unit 145; the roadside sensor set 163; and the memory 167. The processor 225 may have a structure similar to the processor 125 and provide functionality similar to that of the processor 125. Similar description for the processor 225 is not repeated here.

The memory 167 may store any of the data described above with reference to FIG. 1. The memory 167 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the intersection management system 162 includes: a communication module 202; a data retrieval module 204; and a managing module 206. These components of the intersection management system 162 are communicatively coupled to each other via the bus 220. In some embodiments, components of the intersection management system 162 can be stored in a single server or device. In some other embodiments, components of the intersection management system 162 can be distributed and stored across multiple servers or devices. For example, some of the components of the intersection management system 162 may be distributed across the roadside device 160, the cloud server 150, the remote vehicle 110 and the ego vehicle 123.

The communication module 202 can be software including routines for handling communications between the intersection management system 162 and other components of the computer system 200. In some embodiments, the communication module 202 can be stored in the memory 167 of the computer system 200 and can be accessible and executable by the processor 225. The communication module 202 may be adapted for cooperation and communication with the processor 225 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more of the following elements: twin data 114; and control data 137. The communication module 202 may send or receive any of the data or messages described above with reference to FIG. 1 via the communication unit 145.

In some embodiments, the communication module 202 receives data from components of the intersection management system 162 and stores the data in one or more of the storage 241 and the memory 167. For example, the communication module 202 receives data described above with reference to the memory 167 from the communication unit 145 (via the network 105, a DSRC message, a BSM, a DSRC probe, a full-duplex wireless message, etc.) and stores this data in the memory 167 (or temporarily in the storage 241 which may act as a buffer for the computer system 200).

In some embodiments, the communication module 202 may handle communications between components of the intersection management system 162. For example, the communication module 202 may handle communications among the data retrieval module 204 and the managing module 206. Any of these modules may cause the communication module 202 to communicate with the other elements of the computer system 200 or the operating environment 100 (via the communication unit 145). For example, the data retrieval module 204 may use the communication module 202 to communicate with the roadside sensor set 163 and cause the roadside sensor set 163 to record sensor data.

The data retrieval module 204 can be software including routines for retrieving one or more of sensor data and twin data associated with one or more vehicles in the vicinity of an intersection. In some embodiments, the data retrieval module 204 can be stored in the memory 167 of the computer system 200 and can be accessible and executable by the processor 225. The data retrieval module 204 may be adapted for cooperation and communication with the processor 225 and other components of the computer system 200 via a signal line 224.

In some embodiments, the data retrieval module 204 identifies one or more vehicles (e.g., the remote vehicle 110, the ego vehicle 123) within a vicinity of an intersection managed by the intersection management system 162. For example, the data retrieval module 204 receives one or more V2X wireless messages from the one or more vehicles, where each of the one or more V2X wireless messages includes unique vehicle identification data of a corresponding vehicle. Examples of a V2X wireless message described herein include, but are not limited to, the following messages: a DSRC message; a BSM; an LTE message; an LTE-V2X message; a 5G-LTE message; and a millimeter wave message, etc. The data retrieval module 204 identifies the one or more vehicles based on the unique vehicle identification data included in the one or more V2X wireless messages respectively.

For each vehicle in the vicinity of the intersection, the sensor data retrieved by the data retrieval module 204 can include: (1) roadside sensor data recorded by sensors in the roadside sensor set 163; (2) vehicle sensor data recorded by sensors of the vehicle sensor set 182 of the vehicle; or (3) a combination of the roadside sensor data and the vehicle sensor data. The data retrieval module 204 determines one or more driving contexts for the one or more vehicles based on the sensor data.

For example, the data retrieval module 204 may include code and routines that, when executed by the processor 225, cause the processor 225 to operate one or more sensors included in the roadside sensor set 163 to record roadside sensor data describing measurements of a physical environment proximate to the computer system 200 (e.g., a physical environment proximate to the roadside device 160). For example, the physical environment proximate to the roadside device 160 includes the one or more vehicles in the vicinity of the intersection managed by the roadside device 160. In this case, the roadside sensor data recorded by the sensors included in the roadside sensor set 163 can be used to determine one or more driving contexts of the one or more vehicles in the vicinity of the intersection.

In another example, the data retrieval module 204 receives one or more sets of vehicle sensor data from the one or more vehicles (e.g., one set of vehicle sensor data corresponding to one vehicle). Each set of the vehicle sensor data generated by a corresponding vehicle describes a roadway environment proximate to the corresponding vehicle, so that the corresponding set of vehicle sensor data can be used to determine a driving context of the corresponding vehicle.

In yet another example, the data retrieval module 204 retrieves the roadside sensor data from the sensors of the roadside sensor set 163 and the one or more sets of the vehicle sensor data from the one or more vehicles and determines one or more driving contexts for the one or more vehicles based on sensor data that includes the roadside sensor data and the one or more sets of the vehicle sensor data.

A driving context includes data describing a context or scenario within which a particular driving behavior occurs. Examples of a driving context associated with a driving behavior include, but are not limited to, the following: one or more events occurring before the driving behavior (e.g., an event "a traffic light turning red" that occurs before a driving behavior "hitting a brake"); one or more events occurring during the driving behavior (e.g., an event "a traffic light turning yellow" that occurs during a driving behavior "hitting a brake"); one or more events occurring perhaps after the driving behavior including the behavior of other drivers (e.g., a collision that occurs at an intersection after a driver of another vehicle does not stop at a stop sign); time of day; day of week; weather; and whether the driving environment is urban or rural, etc.

In some embodiments, the data retrieval module 204 retrieves, for each of the one or more vehicles within the vicinity of the intersection, twin data that describes one or more digital behavioral twins for the corresponding vehicle.

For example, the data retrieval module 204 receives a set of twin data for multiple vehicles from the digital behavioral twin system 152, where the set of twin data is indexed based on unique vehicle identifiers (IDs) of the multiple vehicles. The data retrieval module 204 stores the set of twin data locally in the memory 167 or the storage 241. For each of the one or more vehicles, the data retrieval module 204 performs one or more of the following operations: receiving, from the vehicle, a V2X wireless message including a unique vehicle ID of the vehicle; parsing out the unique vehicle ID from the V2X wireless message; and using the unique vehicle ID of the vehicle to retrieve twin data of the vehicle from the set of twin data. An example process is illustrated in FIG. 5A.

Figure 5B:
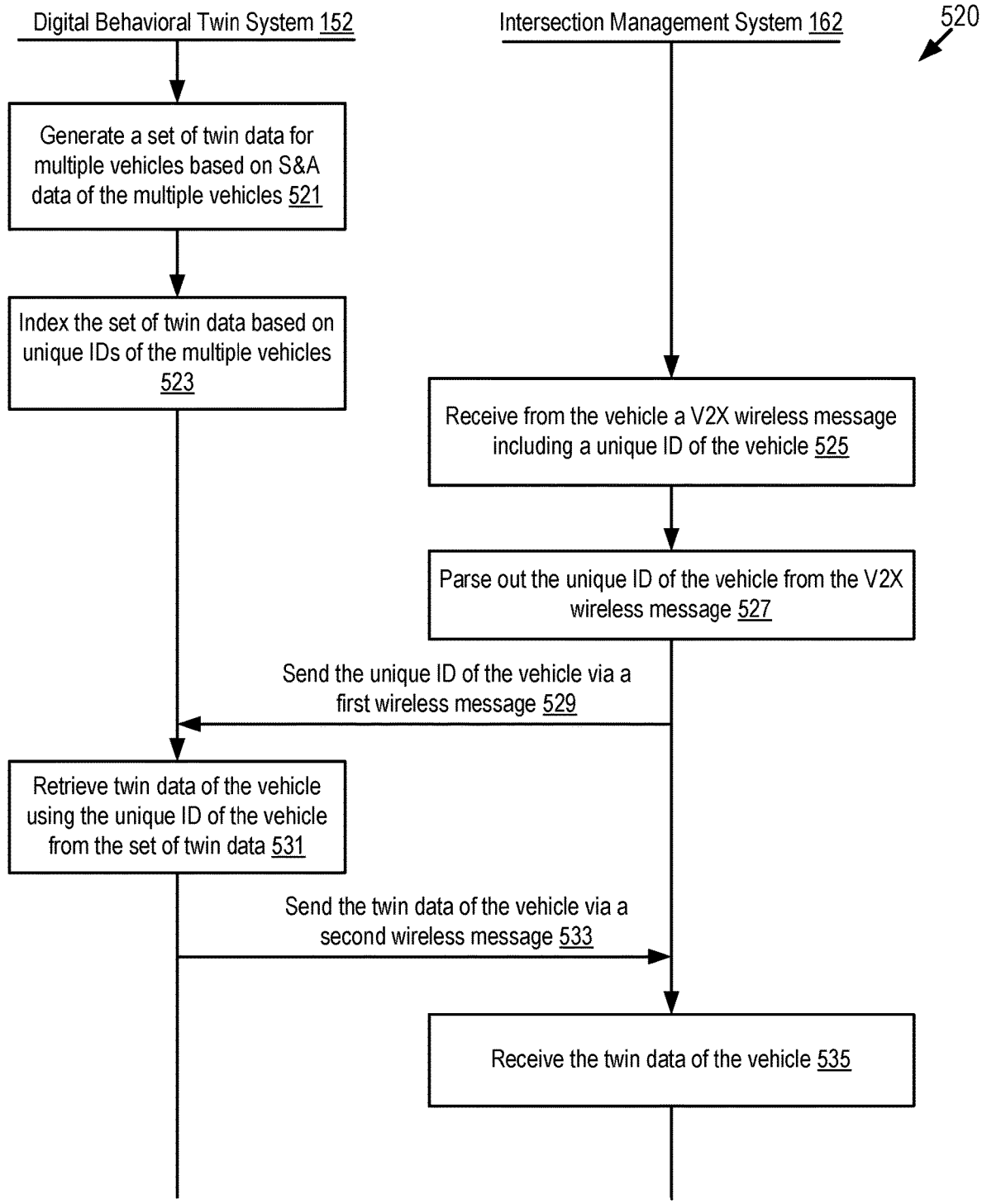
FIG. 5B depicts another process for retrieving twin data describing one or more digital behavioral twins of a vehicle according to some embodiments.

In another example, the set of twin data for the multiple vehicles is only stored in the cloud server 150 by the digital behavioral twin system 152. The data retrieval module 204 performs one or more of the following operations to retrieve a subset of twin data for the one or more vehicles: receiving one or more V2X wireless messages from the one or more vehicles; parsing out one or more unique vehicle IDs of the one or more vehicles from the one or more V2X wireless messages; sending a first wireless message including the one or more unique vehicle IDs to the digital behavioral twin system 152 so that the digital behavioral twin system 152 uses the one or more unique vehicle IDs to retrieve a subset of twin data associated with the one or more vehicles from the set of twin data; and receiving a second wireless message including the subset of twin data from the digital behavioral twin system 152. An example process is illustrated in FIG. 5B.

Figure 5C:
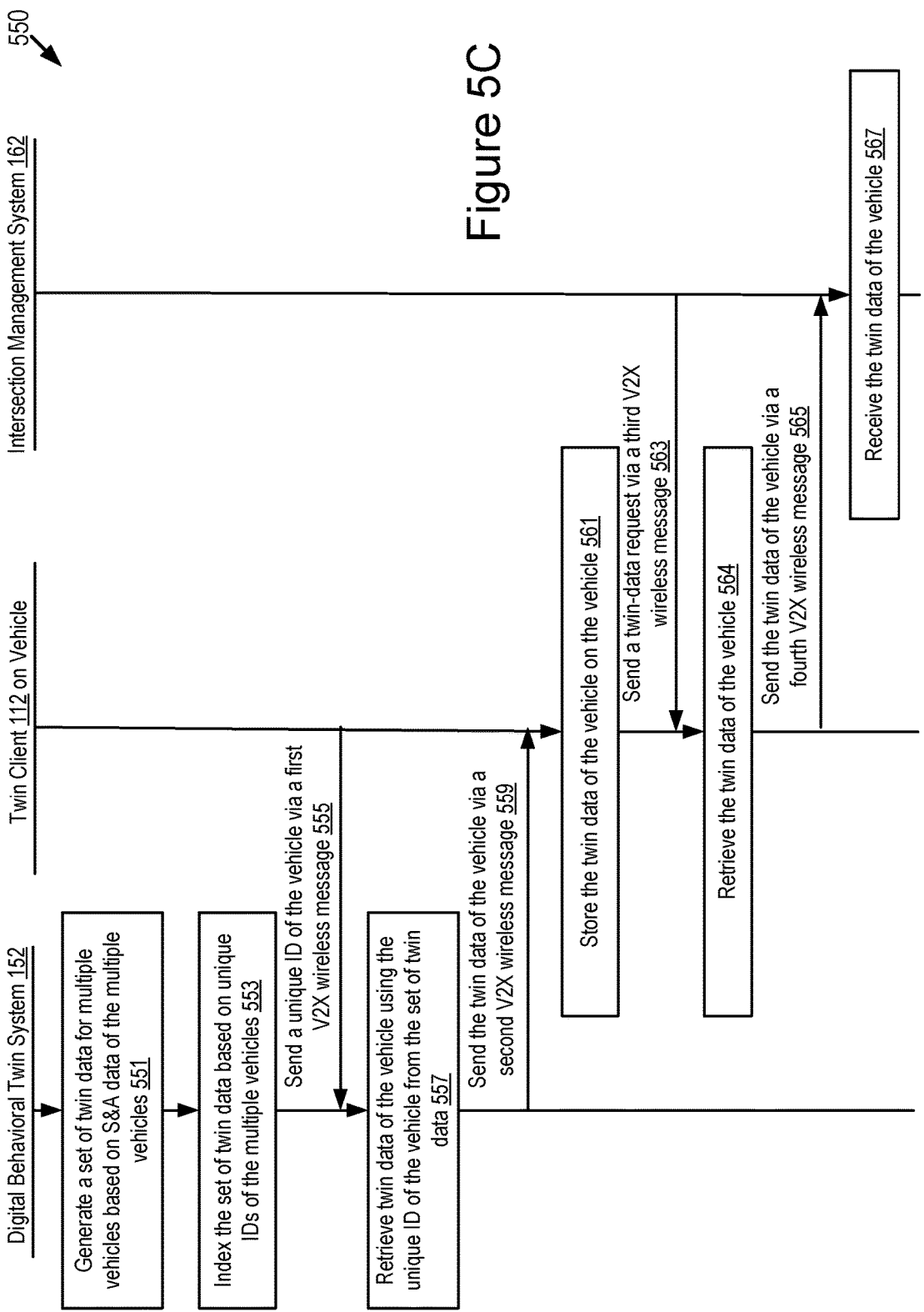
FIG. 5C depicts yet another process for retrieving twin data describing one or more digital behavioral twins of a vehicle according to some embodiments.

In yet another example, the set of twin data for the multiple vehicles is generated by the digital behavioral twin system 152. For each of the multiple vehicles, twin data for the corresponding vehicle is sent to the vehicle for storage by the digital behavioral twin system 152. That is, each vehicle stores its own twin data locally. Then, for each of the one or more vehicles identified to be in the vicinity of the intersection, the data retrieval module 204 performs one or more of the following operations to retrieve twin data of the vehicle: sending a first V2X wireless message to the vehicle, where the first V2X wireless message requests for the twin data of the vehicle and causes the twin client 112 of the vehicle to retrieve its own twin data and to transmit a second V2X wireless message including the twin data of the vehicle to the roadside device 160; and receiving, from the vehicle, the second V2X wireless message including the twin data of the vehicle. An example process is illustrated in FIG. 5C.

The managing module 206 can be software including routines that, when executed by the processor 225, cause the processor 225 to manage traffic in an intersection. In some embodiments, the managing module 206 can be a set of instructions stored in the memory 167 of the computer system 200 and can be accessible and executable by the processor 225. The managing module 206 may be adapted for cooperation and communication with the processor 225 and other components of the computer system 200 via a signal line 281.

In some embodiments, for each vehicle identified to be in the vicinity of an intersection managed by the intersection management system 162, the managing module 206 modifies an operation of the ADAS system 180 of the vehicle to achieve managing a flow of traffic including the vehicle through the intersection based on: (1) sensor data describing a driving context of the vehicle; and (2) twin data describing one or more digital behavioral twins of the vehicle, so that safety and traffic efficiency within an intersection range is improved.

For example, for each vehicle identified to be in the vicinity of the intersection, the managing module 206 modifies the operation of the ADAS system 180 of the vehicle to achieve managing the flow of traffic including the vehicle through the intersection at least by: generating prediction data describing a predicted driving behavior of the vehicle within the driving context based on the one or more digital behavioral twins of the vehicle and the sensor data describing the driving context; and modifying the operation of the ADAS system 180 of the vehicle to achieve managing the flow of traffic including the vehicle through the intersection based on the predicted driving behavior of the vehicle.

Specifically, for each vehicle identified to be in the vicinity of the intersection, the managing module 206 analyzes the predicted driving behavior of the vehicle to determine control data for processing the vehicle through the intersection so that the flow of traffic through the intersection is maximized while a risk of a collision within the intersection range is minimized. Then, the managing module 206 sends a V2X wireless message including the control data to the vehicle so that the operation of the ADAS system 180 of the vehicle is modified based on the control data.

In some embodiments, the control data of the vehicle is configured to control the operation of the ADAS system 180 of the vehicle so that the vehicle is operated in a manner conforming to the control data through the intersection. For example, the control data includes data describing one or more of: (1) a time window when the vehicle enters the intersection; and (2) a behavior that the vehicle assumes when entering the intersection. The behavior that the vehicle assumes when entering the intersection includes one or more of: (1) a speed of the vehicle; (2) an acceleration or a deceleration of the vehicle; (3) a lane on which the vehicle travels; (4) a travelling direction of the vehicle; and (5) a turn that the vehicle takes at the intersection.

In some embodiments, the control data is further configured to control an electronic display of the vehicle to display a graphical output that visually depicts one or more driving instructions for controlling the operation of the ADAS system 180 of the vehicle. For example, the graphical output includes augmented reality (AR) content. The twin client 112 of a non-autonomous vehicle is integrated with AR technologies to provide instructions to a driver of the vehicle to instruct the driver about how to operate the vehicle so that the operation of the vehicle conforms to the control data provided by the intersection management system 162. For example, the ego vehicle 123 includes a Heads Up Display Unit (HUD) including the ability to display colored and transparent AR overlays. These AR overlays provide operation instructions to the driver of the ego vehicle 123.

Figure 8:
FIG. 8 includes a table depicting a comparison of the embodiments described herein versus some existing solutions described above according to some embodiments.

In some embodiments, the intersection range includes a region that covers the intersection. The intersection range is within a predetermined distance before and after the intersection in one or more directions. For example, assume that the intersection is a cross intersection, and the intersection range not only includes the intersection itself, but also includes portions of roads that are within a predetermined distance before and after the intersection in the four directions. An example intersection range is illustrated in FIG. 8.

Multiple example embodiments of the intersection management system 162 are described here. In a first example embodiment, the data retrieval module 204 receives a set of twin data describing digital behavioral twins of various vehicles which are generated by the digital behavioral twin system 152. This set of twin data is stored locally by the data retrieval module 204 on the roadside device 160 and indexed based on unique IDs of the various vehicles. The data retrieval module 204 receives a plurality of DSRC messages from vehicles in the vicinity of the intersection and forms a DSRC message set. For a given time interval, the data retrieval module 204 parses out unique IDs of the vehicles in the vicinity of the intersection from the DSRC messages received during the time interval and uses these unique IDs to retrieve, from the set of twin data, twin data for each of the vehicles that are within the vicinity of the intersection managed by the roadside device 160 (or at least the twin data for the DSRC-enabled vehicles that are within the vicinity of the roadside device 160). The roadside device 160 includes the roadside sensor set 163 (e.g., cameras, LIDAR, etc.) which is operable to measure the environment and determine the current driving context(s) for the vehicles that are within the vicinity of the intersection.

The managing module 206 analyzes the twin data, as well as its local roadside sensor data describing the current driving context for each vehicle in its vicinity, to generate prediction data. The prediction data is digital data that describes how each of the vehicles within the vicinity of the intersection may behave in the driving context. The prediction data is generated using the twin data, and no existing solutions predict the behavior(s) of the vehicles in the vicinity of the intersection using digital behavioral twins such as those described by the twin data.

The managing module 206 then analyzes the prediction data, as well as its local roadside sensor data describing the current driving context for each vehicle in the vicinity of the intersection, to generate control data for each of the DSRC-enabled vehicles that are within the intersection range. For example, the control data describes a time window when these vehicles should enter the intersection as well as the behaviors these vehicles should assume when entering the intersection (e.g., their speeds, acceleration or deceleration, which lane(s) they should use for travel, etc.). The managing module 206 transmits wireless messages to these vehicles that include their unique instances of control data. The twin client 112 of each of these vehicles receives a corresponding instance of the control data and controls an operation of the onboard ADAS systems 180 of the corresponding vehicle so that each of these vehicles is operated in a manner that is consistent with the corresponding instance of the control data. If the vehicles are autonomous, then the vehicles behave in the manner that is consistent with the control data. If the vehicles are not autonomous, then the vehicles each include an electronic display that describes, for a driver of the corresponding vehicle, how to operate the corresponding vehicle through the intersection.

A second example embodiment is similar to the first example embodiment, with the difference being that the roadside device 160 does not store the twin data for each vehicle whose digital behavioral twins have been generated by the digital behavioral twin system 152. Instead of storing all the twin data in this way, which may be prohibitive from a memory size point of view, the intersection management system 162 generates a wireless message (i.e., a query) that includes the unique IDs for vehicles that have provided the intersection management system 162 with a DSRC message during the current time interval, and transmits the wireless message to the cloud server 150 via the network 105. The digital behavioral twin system 152 receives this wireless message, queries its own locally stored twin data set 156 using the unique IDs and retrieves twin data for the vehicles that are identified by the unique IDs. The digital behavioral twin system 152 then builds a wireless message (i.e., a reply to the query) including a twin data subset including the twin data for only these vehicles (which is a subset of the entire library of twin data stored by the cloud server 150). The digital behavioral twin system 152 transmits this wireless message to the intersection management system 162 via the network 105. The intersection management system 162 then provides its functionality using the twin data subset and its own local roadside sensor data describing the driving context for each of the vehicles.

A third example embodiment is similar to the first example embodiment, with the difference being that the roadside device 160 does not store the twin data for each vehicle whose digital behavioral twins have been generated by the digital behavioral twin system 152. Instead of storing all the twin data in this way or retrieving a subset of this twin data from the cloud server 150 as is done in the second example embodiment, which may be prohibitive from a timing point of view, each of the vehicles that provide a DSRC message to the intersection management system 162 stores their own twin data (after it is generated by the digital behavioral twin system 152 of the cloud server 150, or generated locally by the twin client 112 itself which may be modified to provide the functionality of the digital behavioral twin system 152). These vehicles then include their own twin data in the DSRC message or some other type of wireless message that is provided to the intersection management system 162 as these vehicles are approaching the intersection (in some implementations, DSRC may not be used for this wireless message because the payload for the DSRC message may be exceeded by the file size of the twin data). The intersection management system 162 then provides its functionality using the twin data that is received during a particular time interval and its own local roadside sensor data describing the driving context for each of the vehicles.

In some embodiments, a V2V communication capability is integrated here. For example, relative to the ego vehicle 123, other relevant vehicles traveling on the roadway at the same time are referred to as "remote vehicles 110" and they are driven by "remote drivers." At least some of these remote vehicles 110 also include an instance of the twin client 112. In some examples, the twin client 112 of the ego vehicle 123 uses V2V communication to share the digital behavioral twins of the ego vehicle 123 with the twin client 112 of these remote vehicles 110, and vice versa. Suitable forms of V2V communications include, for example, DSRC, mmWave, omni-directional V2V communication (e.g., IEEE 802.11p), 3G, 4G, LTE or any other form of V2V communications.

In some embodiments, the vehicles themselves include a digital behavioral twin system so that they are able to generate their own digital behavioral twins locally.

In some embodiments, data security can be improved by sharing data anonymously. For example, the digital behavioral twins, as well as the S&A data, are shared in an anonymous fashion so that the driver's identity is protected. The digital behavioral twin also does not include private information such as the driver's locations at different times. In some embodiments, all forms of V2X communications (including V2I communications and V2V communications) utilized herein are secure. For example, the V2X communications may be encrypted or utilize a Virtual Private Network (VPN) tunnel.

Example advantages of the intersection management system 162 are listed below: (1) traffic flow through the intersection is maximized while accounting for erratic or dangerous patterns of behaviors of some drivers; (2) safety is improved (e.g., potential collision can be predicted and avoided); (3) data privacy is improved (e.g., all data included in the digital behavioral twins is anonymous and devoid of information that is privacy sensitive); and (4) intuitive risk visualization is provided (e.g., a provided AR visualization is beneficial because it reduces mental fatigue of a driver that may be caused by a behavior that the driver tries to achieve when operating the vehicle through the intersection).

Example Processes

Figure 3:
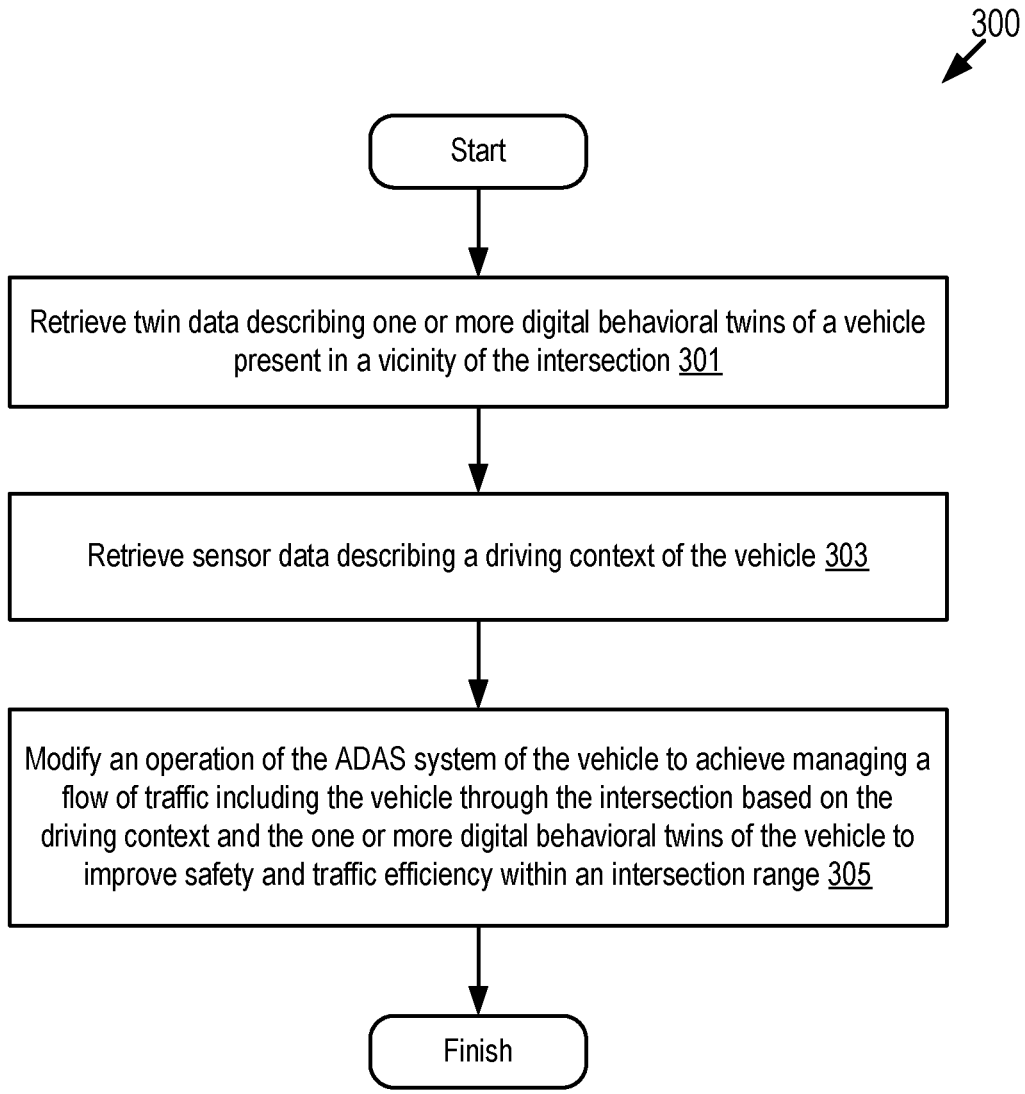
FIG. 3 depicts a method for managing a flow of traffic through an intersection according to some embodiments.

Referring now to FIG. 3, depicted is a flowchart of an example method 300 for managing a flow of traffic through an intersection according to some embodiments. The steps of the method 300 are executable in any order, and not necessarily the order depicted in FIG. 3. In some embodiments, the method 300 is performed for each connected vehicle in a vicinity of the intersection.

At step 301, the data retrieval module 204 retrieves twin data describing one or more digital behavioral twins of a vehicle present in the vicinity of the intersection. Example processes to retrieve the twin data are illustrated in FIGS. 5A-5C.

At step 303, the data retrieval module 204 retrieves sensor data describing a driving context of the vehicle. For example, the sensor data includes vehicle sensor data generated by the vehicle, roadside sensor data generated by one or more sensors on the roadside device 160 or a combination thereof. The data retrieval module 204 retrieves the vehicle sensor data from the vehicle via a V2X wireless message. The data retrieval module 204 retrieves the roadside sensor data from one or more sensors of the roadside device 160.

At step 305, the managing module 206 modifies an operation of the ADAS system 180 of the vehicle to achieve managing a flow of traffic including the vehicle through the intersection based on the driving context of the vehicle and the one or more digital behavioral twins of the vehicle to improve safety and traffic efficiency within an intersection range of the intersection.

Figure 4:
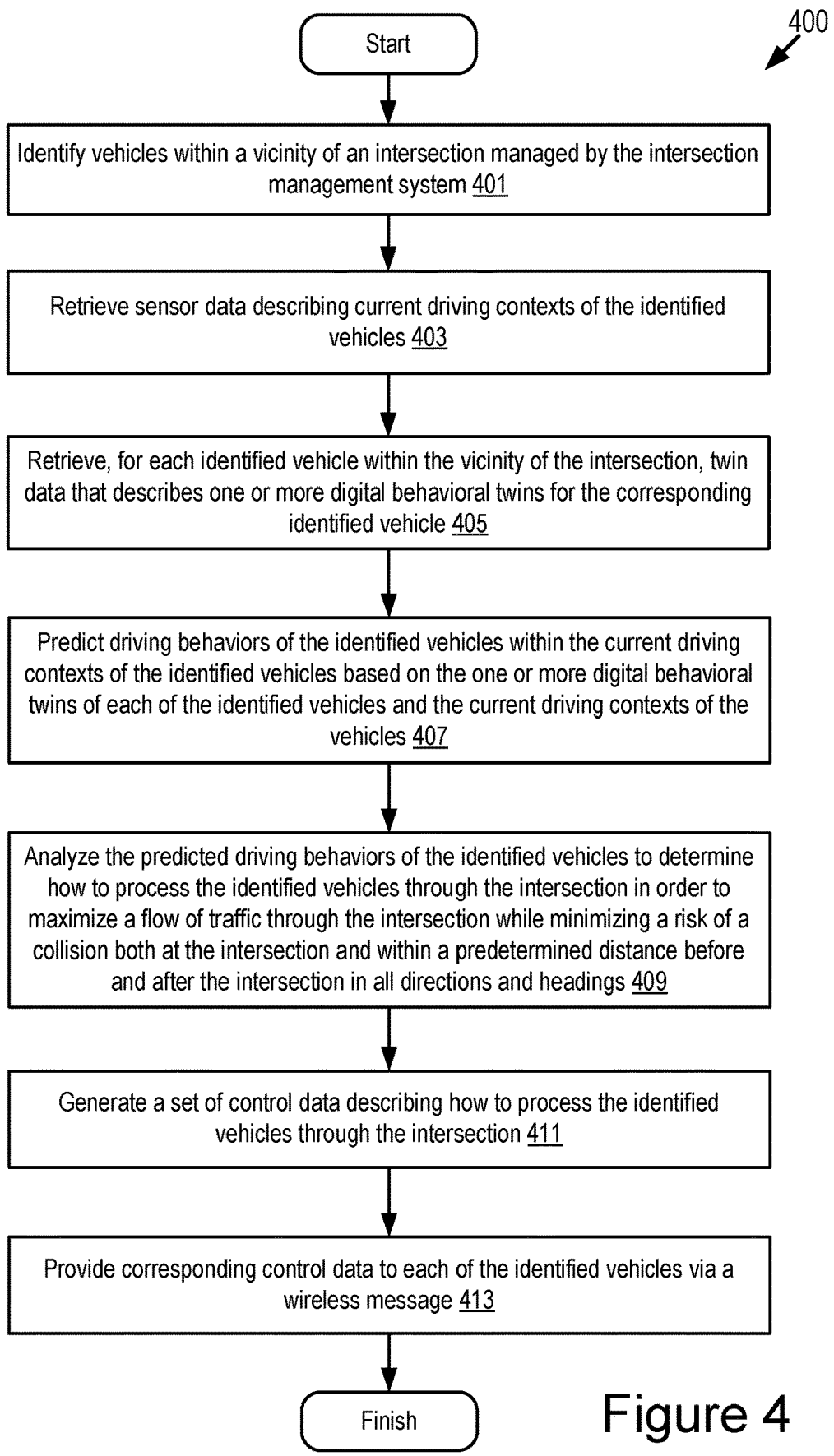
FIG. 4 depicts another method for managing a flow of traffic through an intersection according to some embodiments.

FIG. 4 depicts another method 400 for managing a flow of traffic through an intersection according to some embodiments. The steps of the method 400 are executable in any order, and not necessarily the order depicted in FIG. 4.

At step 401, the data retrieval module 204 identifies vehicles within a vicinity of an intersection managed by the intersection management system 162. For example, the data retrieval module 204 receives DSRC messages from the vehicles and retrieves unique IDs of the vehicles from the DSRC messages respectively.

At step 403, the data retrieval module 204 retrieves sensor data describing current driving contexts of the identified vehicles. For example, the sensor data includes vehicle sensor data generated by the vehicles, roadside sensor data generated by one or more sensors on the roadside device 160 or a combination thereof. The data retrieval module 204 retrieves the vehicle sensor data from V2X wireless messages received from the vehicles. The data retrieval module 204 causes onboard sensors of the roadside device 160 to record the roadside sensor data.

At step 405, the data retrieval module 204 retrieves, for each identified vehicle within the vicinity of the intersection, twin data that describes one or more digital behavioral twins for the corresponding identified vehicle.

At step 407, the managing module 206 predicts driving behaviors of the identified vehicles within the current driving contexts of the identified vehicles based on the one or more digital behavioral twins of each of the identified vehicles and the current driving contexts of the vehicles.

At step 409, the managing module 206 analyzes the predicted driving behaviors of the identified vehicles to determine how to process the identified vehicles through the intersection in order to maximize a flow of traffic through the intersection while minimizing a risk of a collision both at the intersection and within a predetermined distance before and after the intersection in all directions and headings.

At step 411, the managing module 206 generates a set of control data describing how to process the identified vehicles through the intersection.

At step 413, the managing module 206 provides corresponding control data from the set of control data to each of the identified vehicles via a wireless message, so that the corresponding control data modifies an operation of the ADAS system 180 of the corresponding vehicle. In this way, the identified vehicles are operated in a manner conforming to the set of control data.

FIG. 5A depicts a process 500 for retrieving twin data describing one or more digital behavioral twins of a vehicle according to some embodiments. The steps of the process 500 are executable in any order, and not necessarily the order depicted in FIG. 5A.

At step 501, the digital behavioral twin system 152 generates a set of twin data for multiple vehicles based on S&A data of the multiple vehicles.

At step 503, the digital behavioral twin system 152 indexes the set of twin data based on unique IDs of the multiple vehicles.

At step 505, the digital behavioral twin system 152 sends the set of twin data to the roadside device 160 via a wireless message.

At step 507, the intersection management system 162 receives the set of twin data for the multiple vehicles via the wireless message.

At step 509, the intersection management system 162 stores the set of twin data locally in the memory 167 or the storage 241.

At step 511, the intersection management system 162 receives, from the vehicle in the vicinity of the intersection managed by the intersection management system 162, a V2X wireless message including a unique ID of the vehicle.

At step 513, the intersection management system 162 parses out the unique ID of the vehicle from the V2X wireless message.

At step 515, the intersection management system 162 uses the unique ID of the vehicle to retrieve twin data of the vehicle from the set of twin data stored in the memory 167 or the storage 241.

FIG. 5B depicts another process 520 for retrieving twin data describing one or more digital behavioral twins of a vehicle according to some embodiments. The steps of the process 520 are executable in any order, and not necessarily the order depicted in FIG. 5B.

At step 521, the digital behavioral twin system 152 generates a set of twin data for multiple vehicles based on S&A data of the multiple vehicles.

At step 523, the digital behavioral twin system 152 indexes the set of twin data based on unique IDs of the multiple vehicles.

At step 525, the intersection management system 162 receives, from the vehicle in the vicinity of the intersection managed by the intersection management system 162, a V2X wireless message including a unique ID of the vehicle.

At step 527, the intersection management system 162 parses out the unique ID of the vehicle from the V2X wireless message.

At step 529, the intersection management system 162 sends the unique ID of the vehicle to the digital behavioral twin system 152 via a first wireless message.

At step 531, the digital behavioral twin system 152 retrieves twin data of the vehicle using the unique ID of the vehicle from the set of twin data.

At step 533, the digital behavioral twin system 152 sends the twin data of the vehicle to the roadside device 160 via a second wireless message.

At step 535, the intersection management system 162 receives the twin data of the vehicle via the second wireless message.

FIG. 5C depicts yet another process 550 for retrieving twin data describing one or more digital behavioral twins of a vehicle according to some embodiments. The steps of the process 550 are executable in any order, and not necessarily the order depicted in FIG. 5C.

At step 551, the digital behavioral twin system 152 generates a set of twin data for multiple vehicles based on S&A data of the multiple vehicles.

At step 553, the digital behavioral twin system 152 indexes the set of twin data based on unique IDs of the multiple vehicles.

At step 555, the twin client 112 of the vehicle in the vicinity of the intersection sends a unique ID of the vehicle to the digital behavioral twin system 152 via a first V2X wireless message.

At step 557, the digital behavioral twin system 152 retrieves twin data of the vehicle using the unique ID of the vehicle from the set of twin data.

At step 559, the digital behavioral twin system 152 sends the twin data of the vehicle to the twin client 112 of the vehicle via a second V2X wireless message.

At step 561, the twin client 112 of the vehicle stores the twin data of the vehicle in a memory or storage of the vehicle.

At step 563, the intersection management system 162 sends a twin-data request to the twin client 112 of the vehicle via a third V2X wireless message.

At step 564, the twin client 112 of the vehicle retrieves the twin data of the vehicle from the memory or storage of the vehicle.

At step 565, the twin client 112 of the vehicle sends the twin data of the vehicle to the intersection management system 162 via a fourth V2X wireless message.

At step 567, the intersection management system 162 receives the twin data of the vehicle from the fourth V2X wireless message.

Figure 6B:
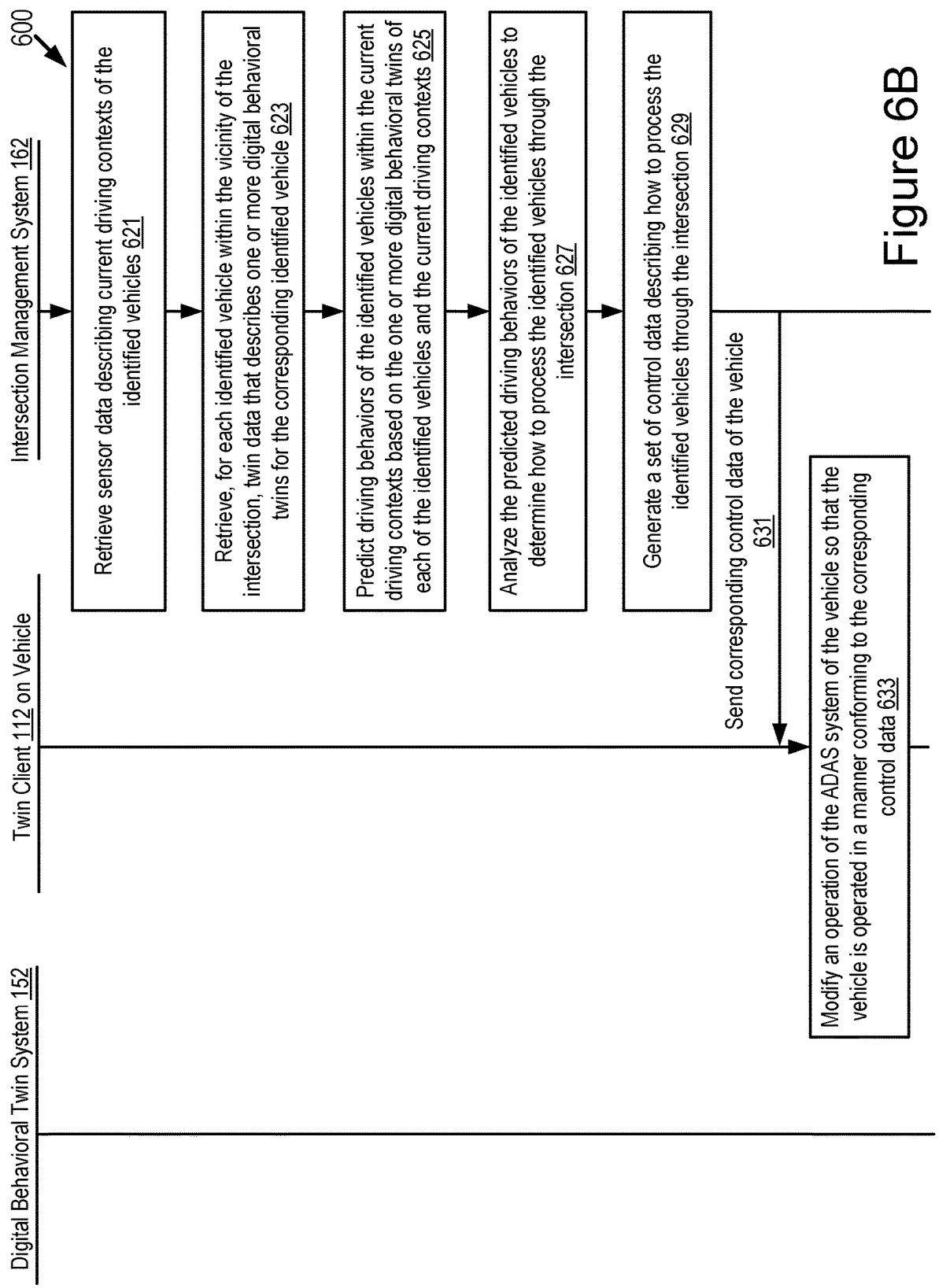

FIGS. 6A-6B depicts an example process 600 for managing a flow of traffic through an intersection according to some embodiments. The steps of the process 600 are executable in any order, and not necessarily the order depicted in FIGS. 6A-6B.

Referring to FIG. 6A, at step 601, the twin client 112 of a vehicle causes one or more vehicle sensors of the vehicle to record vehicle sensor data.

At step 603, the twin client 112 provides the vehicle sensor data to the one or more ADAS systems 180 of the vehicle and executes the one or more ADAS systems 180 based on the vehicle sensor data.

At step 605, the twin client 112 receives ADAS data from the one or more ADAS systems 180.

At step 607, the twin client 112 monitors the vehicle sensor data and the ADAS data (the S&A data) over time.

At step 609, the twin client 112 causes the communication unit 145 of the vehicle to securely send the S&A data of the vehicle to the digital behavioral twin system 152 via a first V2X wireless message over the network 105.

In this way, by performing operations similar to those at steps 601-609 for multiple vehicles respectively, the digital behavioral twin system 152 receives S&A data for the multiple vehicles.

At step 611, the digital behavioral twin system 152 builds a set of twin data for the multiple vehicles based on the S&A data of the multiple vehicles. For example, the multiple vehicles include the ego vehicle 123 and the remote vehicles 110, and the set of twin data includes twin data for the ego vehicle 123 and twin data for the remote vehicles 110.

At step 613, the digital behavioral twin system 152 indexes the set of twin data based on unique IDs of the multiple vehicles.

At step 615, the digital behavioral twin system 152 sends twin data to either the roadside device 160 (as a single data set or as various subsets as described above for the first and second example embodiments, respectively) or the respective vehicles (e.g., the ego vehicle 123 and any remote vehicles 110 that include a twin client and a communication unit) (as described above in the third example embodiment). By way of examples, in FIGS. 6A-6B, the digital behavioral twin system 152 sends the set of twin data to the intersection management system 162 for storage on the roadside device 160 via a wireless message.

At step 617, the intersection management system 162 stores the set of twin data in the memory 167 or storage 241 of the roadside device 160.

At step 619, the intersection management system 162 identifies vehicles within a vicinity of the intersection managed by the intersection management system 162. For example, the intersection management system 162 determines an identity of each vehicle (or each connected vehicle) within the vicinity of the intersection managed by the intersection management system 162.

Referring to FIG. 6B, at step 621, the intersection management system 162 retrieves sensor data describing current driving contexts of the identified vehicles. For example, the sensor data includes vehicle sensor data generated by the identified vehicles, roadside sensor data generated by one or more sensors on the roadside device 160 or a combination thereof. The intersection management system 162 retrieves the vehicle sensor data from the vehicles via V2X wireless messages. The intersection management system 162 causes onboard sensors of the roadside device 160 to record the roadside sensor data.

At step 623, the intersection management system 162 retrieves, for each identified vehicle within the vicinity of the intersection, twin data that describes one or more digital behavioral twins for the corresponding identified vehicle.

At step 625, the intersection management system 162 predicts driving behaviors of the identified vehicles within the current driving contexts of the identified vehicles based on the one or more digital behavioral twins of each of the identified vehicles and the current driving contexts of the identified vehicles.

At step 627, the intersection management system 162 analyzes the predicted driving behaviors of the identified vehicles to determine how to process the identified vehicles through the intersection in order to maximize a flow of traffic through the intersection while minimizing a risk of a collision both at the intersection and within a predetermined distance before and after the intersection in all directions and headings.

At step 629, the intersection management system 162 generates a set of control data describing how to process the identified vehicles through the intersection.

At step 631, the intersection management system 162 sends corresponding control data of an identified vehicle via a wireless message.

At step 633, the twin client 112 of the identified vehicle uses the corresponding control data to modify an operation of the ADAS system 180 of the identified vehicle so that the identified vehicle is operated in a manner conforming to the corresponding control data. For example, the twin client 112 of the identified vehicle controls the operation of one or more ADAS systems 180 so that the vehicle's operation complies with the corresponding control data. In another example, the twin client 112 of the identified vehicle generates a visualization that visually depicts instructions for the driver of the vehicle to operate the vehicle to comply with the corresponding control data.

By performing operations similar to those at steps 631 and 633 for each of the identified vehicles, the identified vehicles are operated in a manner conforming to the set of control data.

Figure 7:
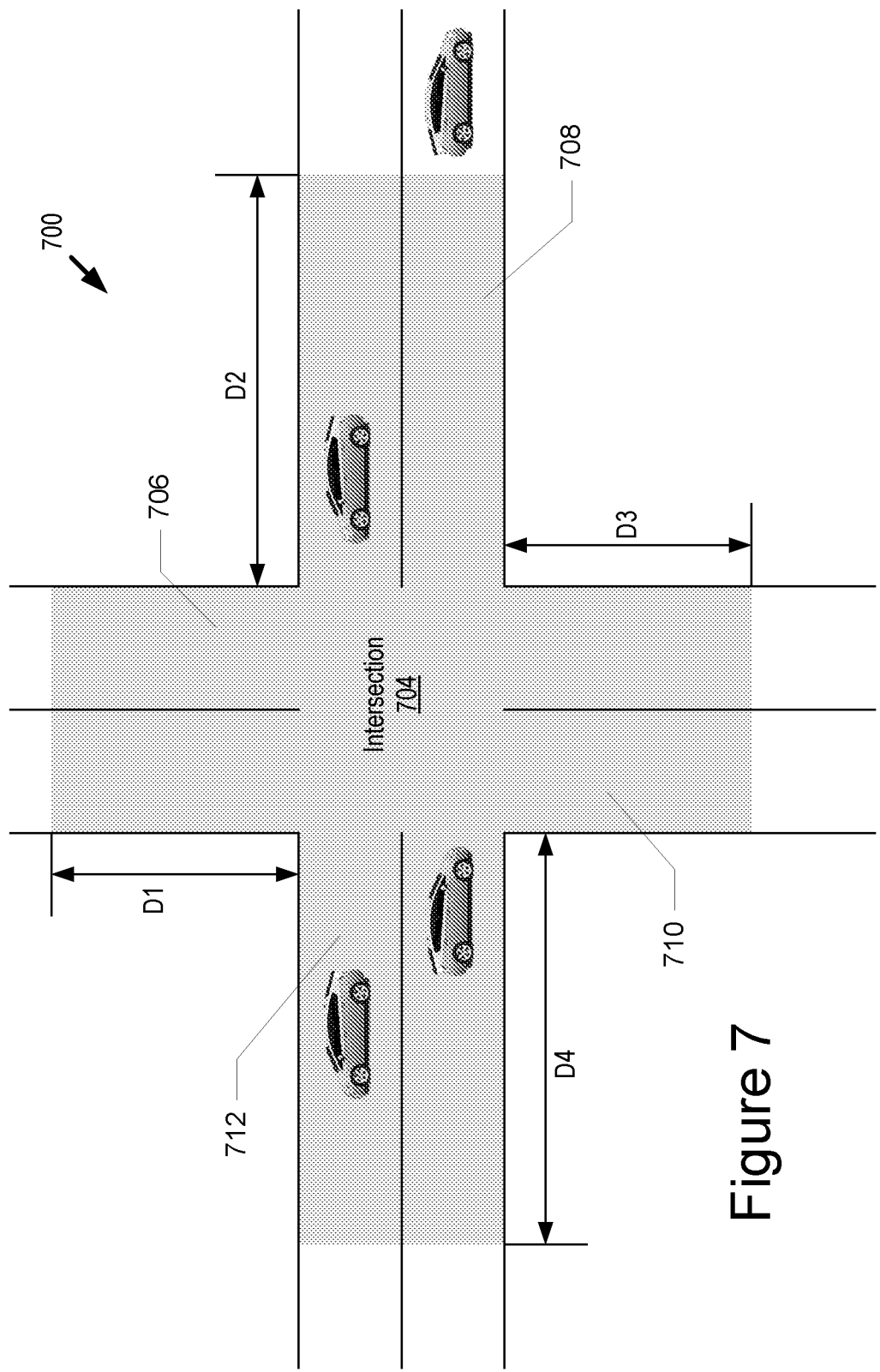
FIG. 7 is a graphical representation illustrating an example intersection range according to some embodiments.

FIG. 7 is a graphical representation illustrating an example intersection range 700 according to some embodiments. The intersection range 700 includes an intersection 704, a portion of a road 706 within a first distance D1 from the intersection 704, a portion of a road 708 within a second distance D2 from the intersection 704, a portion of a road 710 within a third distance D3 from the intersection 704 and a portion of a road 712 within a fourth distance D4 from the intersection 704. The intersection range 700 is illustrated with a shaded area. The first distance D1, the second distance D2, the third distance D3 and the fourth distance D4 can be identical to one another or different from one another.

FIG. 8 includes a table 800 depicting a comparison of the embodiments described herein versus some existing solutions described above according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving vehicle sensor data and Advanced Driver System (ADAS) data from a set of vehicles that describe behavior of drivers for the set of vehicles and driving context for the behavior of the drivers for the set of vehicles;
   generating one or more digital behavioral twins for a vehicle based on the vehicle sensor data and the ADAS data;
   determining a predicted driving behavior of a driver of the vehicle based on the driving context; and
   modifying an operation of an ADAS of the vehicle through an intersection based on the driving context and the one or more digital behavioral twins of the vehicle to improve safety and traffic efficiency.

2. The method of claim 1, wherein the driving context includes one or more of an event occurring before the behavior of drivers, an event occurring after the behavior of drivers, a time of day, a day of a week, a weather condition, or an environmental condition.

3. The method of claim 1, wherein modifying the operation of the ADAS of the vehicle further comprises:
   analyzing the predicted driving behavior of the vehicle to determine control data for processing the vehicle through the intersection so that a flow of traffic through the intersection is maximized while a risk of a collision within an intersection range is minimized; and
   sending a wireless message including the control data to the vehicle so that the operation of the ADAS of the vehicle is modified based on the control data.

4. The method of claim 3, wherein the control data controls the operation of the ADAS of the vehicle through the intersection so that the vehicle is operated in a manner conforming to the control data.

5. The method of claim 4, wherein the control data further controls an electronic display of the vehicle to display a graphical output that visually depicts one or more driving instructions for controlling the operation of the ADAS of the vehicle.

6. The method of claim 3, wherein the control data describes a time window when the vehicle enters the intersection and instructions for controlling the operation of the ADAS when entering the intersection.

7. The method of claim 6, wherein the instructions for controlling the operation of the ADAS when entering the intersection are for controlling one or more of: a speed of the vehicle; an acceleration or a deceleration of the vehicle; a lane on which the vehicle travels; a travelling direction of the vehicle; or a turn that the vehicle takes at the intersection.

8. The method of claim 1, wherein method is performed by a roadside device and the vehicle sensor data and the ADAS data is indexed as a set of twin data based on unique identifiers (IDs) for the set of vehicles and further comprising:
   storing the set of twin data locally by the roadside device;
   receiving, from the vehicle, a Vehicle-to-Everything (V2X) wireless message including a unique ID of the vehicle;
   parsing out the unique ID of the vehicle from the V2X wireless message; and
   using the unique ID of the vehicle to retrieve twin data of the vehicle from the set of twin data.

9. The method of claim 1, wherein the vehicle sensor data and the ADAS data is indexed by a digital behavioral twin system as a set of twin data based on unique identifiers (IDs) for the set of vehicles and further comprising:
   retrieving twin data describing the one or more digital behavioral twins of the vehicle by:
      receiving a Vehicle-to-Everything (V2X) wireless message from the vehicle;
      parsing out a unique ID of the vehicle from the V2X wireless message;
      sending a first wireless message including the unique ID to the digital behavioral twin system so that the digital behavioral twin system uses the unique ID of the vehicle to retrieve the twin data of the vehicle from the set of twin data; and
      receiving a second wireless message including the twin data from the digital behavioral twin system.

10. The method of claim 1, wherein:
    the vehicle sensor data and the ADAS data is indexed by a digital twin behavioral twin system as a set of twin data based on unique identifiers (IDs) for the set of vehicles;
    twin data of the vehicle is generated by a digital behavioral twin system and sent to the vehicle for storage by the digital behavioral twin system; and
    retrieving the twin data describing the one or more digital behavioral twins of the vehicle comprises:
      receiving a Vehicle-to-Everything (V2X) wireless message including the twin data from the vehicle.

11. The method of claim 1, wherein the operation of the ADAS is modified to improve safety and traffic efficiency within an intersection range that includes a region that covers the intersection and that is within a predetermined distance before and after the intersection in one or more directions.

12. A system comprising:
    a processor; and
    a non-transitory memory storing computer code which, when executed by the processor, causes the processor to:
      receive vehicle sensor data and Advanced Driver System (ADAS) data from a set of vehicles that describe behavior of drivers for the set of vehicles and driving context for the behavior of the drivers for the set of vehicles;
      generate one or more digital behavioral twins for a vehicle based on the vehicle sensor data and the ADAS data;
      determine a predicted driving behavior of a driver of the vehicle based on the driving context; and
      modify an operation of an ADAS of the vehicle through an intersection based on the driving context and the one or more digital behavioral twins of the vehicle to improve safety and traffic efficiency.

13. The system of claim 12, wherein the driving context includes one or more of an event occurring before the behavior of drivers, an event occurring after the behavior of drivers, a time of day, a day of a week, a weather condition, or an environmental condition.

14. The system of claim 12, wherein the computer code which, when executed by the processor, causes the processor to modify the operation of the ADAS of the vehicle at least by:
   analyzing the predicted driving behavior of the vehicle to determine control data for processing the vehicle through the intersection so that a flow of traffic through the intersection is maximized while a risk of a collision within an intersection range is minimized; and
   sending a wireless message including the control data to the vehicle so that the operation of the ADAS of the vehicle is modified based on the control data.

15. The system of claim 14, wherein the control data controls the operation of the ADAS of the vehicle through the intersection so that the vehicle is operated in a manner conforming to the control data.

16. The system of claim 15, wherein the control data further controls an electronic display of the vehicle to display a graphical output that visually depicts one or more driving instructions for controlling the operation of the ADAS of the vehicle.

17. The system of claim 14, wherein the control data describes a time window when the vehicle enters the intersection and instructions for controlling the operation of the ADAS when entering the intersection.

18. The system of claim 17, wherein the instructions for controlling the operation of the ADAS when entering the intersection are for controlling one or more of: a speed of the vehicle; an acceleration or a deceleration of the vehicle; a lane on which the vehicle travels; a travelling direction of the vehicle; or a turn that the vehicle takes at the intersection.

19. A computer program product comprising a non-transitory memory storing computer-executable code that, when executed by a processor, causes the processor to:
   receive vehicle sensor data and Advanced Driver System (ADAS) data from a set of vehicles that describe behavior of drivers for the set of vehicles and driving context for the behavior of the drivers for the set of vehicles;
   generate one or more digital behavioral twins for a vehicle based on the vehicle sensor data and the ADAS data;
   determine a predicted driving behavior of a driver of the vehicle based on the driving context; and
   modify an operation of an ADAS of the vehicle through an intersection based on the driving context and the one or more digital behavioral twins of the vehicle to improve safety and traffic efficiency.

20. The computer program product of claim 19, wherein the driving context includes one or more of an event occurring before the behavior of drivers, an event occurring after the behavior of drivers, a time of day, a day of a week, a weather condition, or an environmental condition.

* * * * *